US010866756B2

(12) United States Patent  (10) Patent No.: US 10,866,756 B2
Maeda et al.  (45) Date of Patent: Dec. 15, 2020

(54) CONTROL DEVICE AND COMPUTER READABLE RECORDING MEDIUM STORING CONTROL PROGRAM

(71) Applicant: FUJITSU LIMITED, Kawasaki (JP)

(72) Inventors: Mihoko Maeda, Kawasaki (JP); Atsuhiro Otaka, Kawasaki (JP); Akiko Sakaguchi, Yokohama (JP); Hidetoshi Satou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 15/797,513

(22) Filed: Oct. 30, 2017

(65) Prior Publication Data

US 2018/0136847 A1  May 17, 2018

(30) Foreign Application Priority Data

Nov. 11, 2016 (JP) ................................. 2016-220733

(51) Int. Cl.
*G06F 3/06* (2006.01)

(52) U.S. Cl.
CPC ............ *G06F 3/065* (2013.01); *G06F 3/0616* (2013.01); *G06F 3/0659* (2013.01); *G06F 3/0683* (2013.01); *G06F 3/0619* (2013.01)

(58) Field of Classification Search
None
See application file for complete search history.

(56) References Cited

U.S. PATENT DOCUMENTS

| 7,035,880 B1* | 4/2006 | Crescenti | G06F 11/1464 |
| 8,122,158 B1* | 2/2012 | Kudva | G06F 3/0613 |
| | | | 345/473 |
| 9,235,535 B1* | 1/2016 | Shim | G06F 12/16 |
| 2004/0098423 A1 | 5/2004 | Chigusa et al. | |
| 2008/0208929 A1* | 8/2008 | Phillipi | G06F 11/1451 |
| 2013/0226870 A1* | 8/2013 | Dash | G06F 3/0619 |
| | | | 707/634 |
| 2014/0337285 A1* | 11/2014 | Gokhale | G06F 11/1464 |
| | | | 707/610 |

FOREIGN PATENT DOCUMENTS

| JP | 2001-195314 | 7/2001 |
| JP | 2004-171249 | 6/2004 |
| JP | 2008-171241 | 7/2008 |

\* cited by examiner

*Primary Examiner* — William E. Baughman
(74) *Attorney, Agent, or Firm* — Staas & Halsey LLP

(57) ABSTRACT

A control device configured to backup data updated in response to update requests issued by a plurality of host devices, includes a memory; and a processor configured to: record, in the memory, a reception interval and a last reception time of the update requests for each host device, compare an elapsed time from the last reception time to a certain timing and the reception interval at the certain timing for each host device, and start the backup according to a comparison result for each host device.

12 Claims, 24 Drawing Sheets

FIG. 8

| FILTER INFORMATION | |
|---|---|
| FILTER NUMBER | NOTIFICATION TARGET EVENT |
| 1 | WHEN RAID GROUP OR THIN-PRO POOL REGISTRATION IS COMPLETED |
| 2 | WHEN RAID GROUP OR THIN-PRO POOL DELETION IS COMPLETED |
| 3 | WHEN VOLUME REGISTRATION IS COMPLETED |
| ... | ... |
| 11 | WHEN STATE OF COPY SESSION IS CHANGED |
| ... | ... |

FIG. 9

```
1   instance of CIM_IndicationSubscription
2   {
3       OtherOnFatalErrorPolicy = NULL;
4   - - - - - - - - - -
5   ...
6   - - - - - - - - - -
7       SubscriptionInfo = NULL;
8       Filter = "interop:CIM_IndicationFilter.CreationClassName=\
9   "CIM_IndicationFilter\",Name=\"DMTF:Block Services:SELECT * FR
10  OM CIM_InstCreation WHERE SourceInstance ISA CIM_StoragePool\"
11  ,SystemCreationClassName=\"CIM_ComputerSystem\",SystemName=\"v
12  xTarget\"";
13      Handler = "interop:CIM_ListenerDestinationCIMXML.Creation
14  ClassName=\"CIM_ListenerDestinationCIMXML\",Name=\"%a%\",Syst
15  emCreationClassName=\"CIM_ComputerSystem\",SystemName=\"vxTar
16  get\"";
17      SubscriptionState = 2;
18      RepeatNotificationPolicy = 2;
19      OnFatalErrorPolicy = 2;
20      TimeOfLastStateChange = "%b%";
21      SubscriptionStartTime = "%b%";
22  };
```

```
1   instance of CIM_ListenerDestinationCIMXML
2   {
3       InstanceID = NULL;
4       Caption = NULL;
5       Description = NULL;
6       ElementName = NULL;
7       Generation = NULL;
8       OtherPersistenceType = NULL;
9       OtherProtocol = NULL;
10      Protocol = 2;
11      SystemCreationClassName = "CIM_ComputerSystem";
12      SystemName = "vxTarget";
13      CreationClassName = "CIM_ListenerDestinationCIMXML";
14      Name = "Listener1";
15      Destination = "192.0.2.0/24";
16      PersistenceType = 2;
17  };
```

FIG. 11

| SUBSCRIPTION INDIVIDUAL INFORMATION | |
|---|---|
| KEYWORD IDENTIFIER | VALUE |
| L1%a% | Listener1 |
| L1%b% | 20160630060510.116666+000 |
| L2%a% | Listener2 |
| L2%b% | 20160630060511.866666+000 |
| ... | ... |

| FILTER NUMBER | 1 | 2 | 3 | 4 | 5 | 6 | 7 | 8 | ... | |
|---|---|---|---|---|---|---|---|---|---|---|
| Listener1 | 1 | 1 | 1 | 1 | 1 | 0 | 0 | 1 | 1 | 1 | ... |
| Listener2 | 1 | 1 | 1 | 1 | 0 | 1 | 1 | 1 | 0 | 0 | 1 | ... |
| Listener3 | 1 | 1 | 1 | 0 | 1 | 1 | 1 | 1 | 1 | 1 | 1 | ... |

| UPDATE MANAGEMENT INFORMATION | | 126 |
|---|---|---|
| ITEM NAME | VALUE | |
| REPOSITORY UPDATE FLAG | TRUE | |
| Listener1 LAST UPDATE TIME | 10:00:04.312 | |
| Listener1 UPDATE INTERVAL (msec) | 2035 | |
| Listener2 LAST UPDATE TIME | 10:00:05.414 | |
| Listener2 UPDATE INTERVAL (msec) | 0 (INVALID VALUE) | |
| ... | ... | |

FIG. 18

| ITEM NAME | TO BE WRITTEN INTO BUD |
|---|---|
| FILTER INFORMATION | YES |
| DUMMY SUBSCRIPTION | NO |
| LISTENER INFORMATION | YES |
| SUBSCRIPTION INDIVIDUAL INFORMATION | YES |
| SUBSCRIPTION BITMAP | YES |
| UPDATE MANAGEMENT INFORMATION | NO |

FIG. 21

10:00:04.000 Listener1 FILTER2 REGISTRATION

| | | 126e |
|---|---|---|
| REPOSITORY UPDATE FLAG | TRUE | |
| Listener1 LAST UPDATE TIME | 10:00:04.000 | |
| Listener1 UPDATE INTERVAL (msec) | 2000 | |
| Listener2 LAST UPDATE TIME | 10:00:03.000 | |
| Listener2 UPDATE INTERVAL (msec) | 0 (INVALID VALUE) | |

AT 10:00:05.000, CHECK THAT REPOSITORY UPDATE FLAG → TRUE
→ POSTPONE BACKUP SINCE ELAPSED TIME FROM Listener1 LAST UPDATE TIME (10:00:04.000) IS SHORTER THAN UPDATE INTERVAL (2000 msec), AND ELAPSED TIME FROM Listener2 LAST UPDATE TIME (10:00:03.000) IS SHORTER THAN FIVE SECONDS

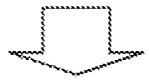

10:00:06.000 Listener2 FILTER6 REGISTRATION

| | | 126f |
|---|---|---|
| REPOSITORY UPDATE FLAG | TRUE | |
| Listener1 LAST UPDATE TIME | 10:00:04.000 | |
| Listener1 UPDATE INTERVAL (msec) | 2000 | |
| Listener2 LAST UPDATE TIME | 10:00:06.000 | |
| Listener2 UPDATE INTERVAL (msec) | 3000 | |

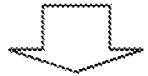

FIG. 22

10:00:09.000 Listener2 FILTER7 REGISTRATION

| | | 126g |
|---|---|---|
| REPOSITORY UPDATE FLAG | TRUE | |
| Listener1 LAST UPDATE TIME | 10:00:04.000 | |
| Listener1 UPDATE INTERVAL (msec) | 2000 | |
| Listener2 LAST UPDATE TIME | 10:00:09.000 | |
| Listener2 UPDATE INTERVAL (msec) | 3000 | |

AT 10:00:10.000, CHECK THAT REPOSITORY UPDATE FLAG → TRUE
→ POSTPONE BACKUP SINCE ELAPSED TIME FROM Listener2 LAST UPDATE (10:00:09.000) IS NOT LONGER THAN UPDATE INTERVAL (3000 msec)

AT 10:00:15.000, CHECK THAT REPOSITORY UPDATE FLAG → TRUE
→ START BACKUP SINCE BOTH ELAPSED TIMES FROM Listener1 AND Listener2 LAST UPDATE TIMES ARE LONGER THAN UPDATE INTERVAL

10:00:16.000 AFTER BACKUP COMPLETION

| | | 126h |
|---|---|---|
| REPOSITORY UPDATE FLAG | FALSE | |
| Listener1 LAST UPDATE TIME | 10:00:04.000 | |
| Listener1 UPDATE INTERVAL (msec) | 2000 | |
| Listener2 LAST UPDATE TIME | 10:00:06.000 | |
| Listener2 UPDATE INTERVAL (msec) | 3000 | |

FIG. 23A

Listener1                                                                 122a

```
1   instance of CIM_IndicationSubscription
2   {
3       OtherOnFatalErrorPolicy = NULL;
...
7       SubscriptionInfo = NULL;
8       Filter = "interop:CIM_IndicationFilter.CreationClassName=\
9   "CIM_IndicationFilter\",Name=\"DMTF:Block Services:SELECT * FR
10  OM CIM_InstCreation WHERE SourceInstance ISA CIM_StoragePool"
11  ,SystemCreationClassName=\"CIM_ComputerSystem\",SystemName=\"v
12  xTarget\"";
13      Handler = "interop:CIM_ListenerDestinationCIMXML.Creation
14  ClassName=\"CIM_ListenerDestinationCIMXML\",Name=\"Listener1\
15  ",SystemCreationClassName=\"CIM_ComputerSystem\",SystemName=\
16  "vxTarget\"";
17      SubscriptionState = 2;              ( REPLACE KEY WORD  )
18      RepeatNotificationPolicy = 2;       ( WITH L1 INFORMATION )
19      OnFatalErrorPolicy = 2;
20      TimeOfLastStateChange = "20160630060510.116666+000";
21      SubscriptionStartTime = "20160630060510.116666+000";
22  };
```

FIG. 23B

Listener2                                                                 122b

```
1   instance of CIM_IndicationSubscription
2   {
3       OtherOnFatalErrorPolicy = NULL;
...
7       SubscriptionInfo = NULL;
8       Filter = "interop:CIM_IndicationFilter.CreationClassName=\
9   "CIM_IndicationFilter\",Name=\"DMTF:Block Services:SELECT * FR
10  OM CIM_InstCreation WHERE SourceInstance ISA CIM_StoragePool"
11  ,SystemCreationClassName=\"CIM_ComputerSystem\",SystemName=\"v
12  xTarget\"";
13      Handler = "interop:CIM_ListenerDestinationCIMXML.Creation
14  ClassName=\"CIM_ListenerDestinationCIMXML\",Name=\"Listener2\
15  ",SystemCreationClassName=\"CIM_ComputerSystem\",SystemName=\
16  "vxTarget\"";
17      SubscriptionState = 2;              ( REPLACE KEY WORD  )
18      RepeatNotificationPolicy = 2;       ( WITH L2 INFORMATION )
19      OnFatalErrorPolicy = 2;
20      TimeOfLastStateChange = "20160630060511.116666+000";
21      SubscriptionStartTime = "20160630060511.116666+000";
22  };
```

CONTROL DEVICE AND COMPUTER READABLE RECORDING MEDIUM STORING CONTROL PROGRAM

CROSS-REFERENCE TO RELATED APPLICATION

This application is based upon and claims the benefit of priority of the prior Japanese Patent Application No. 2016-220733, filed on Nov. 11, 2016, the entire contents of which are incorporated herein by reference.

FIELD

The embodiments discussed herein are related to a control device and a computer readable recording medium storing a control program.

BACKGROUND

In an information processing system, sometimes, a backup of the data is acquired to cope with the loss of data. In the backup, for example, the data held in one storage device of an information processing device is duplicated and the duplicated data is stored in another storage device of the same device or another device. Even if the original data is not able to be used due to a failure or the like, the information processing device may restore the original data to the state at the time of backup using the data stored in another storage device.

For example, a backup storage control device is proposed, which performs backup by writing the data stored in a volatile memory into a non-volatile memory. In a state in which a frequency of accessing the backup target data in the volatile memory is low, the backup storage control device performs backup processing to a non-volatile memory every time the backup target data in the volatile memory is accessed.

In addition, a computer system that performs an on-line backup for a database by predicting a main processing amount during the time of backup from a task processing amount of the operating database (main processing amount) and determining whether or not to perform the backup, is also proposed.

A backup device that categorizes the backup target data into a plurality of classes according to update frequency and the importance of the data, and enables setting of backup availability for each class, is also proposed.

Examples of the related art include Japanese Laid-open Patent Publication No. 2001-195314, Japanese Laid-open Patent Publication No. 2004-171249, and Japanese Laid-open Patent Publication No. 2008-171241.

Sometimes a certain device updates data stored in a storage device in response to a series of update requests issued by each of a plurality of devices. At this time, a timing of performing the backup of the data becomes a problem.

For example, it is considered that backup data corresponding to the relevant data is acquired every time the update is performed according to each of the update requests as in the proposal described above. However, if the backup is acquired for every update request, the frequency of backup is easily increased. Therefore, there is a possibility that other processing (for example, original task processing or the like) may be affected by a load of the backup processing. Particularly, this effect may become more serious as the number of host devices which issues the update requests increases.

SUMMARY

According to an aspect of the embodiments, a control device configured to backup data updated in response to update requests issued by a plurality of host devices, includes a memory; and a processor configured to: record, in the memory, a reception interval and a last reception time of the update requests for each host device, compare an elapsed time from the last reception time to a certain timing and the reception interval at the certain timing for each host device, and start the backup according to a comparison result for each host device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of filter information;

FIG. 9 is a diagram illustrating an example of a dummy subscription;

FIG. 10 is a diagram illustrating an example of listener information;

FIG. 11 is a diagram illustrating an example of subscription individual information;

FIG. 12 is a diagram illustrating an example of a subscription bitmap;

FIG. 13 is a diagram illustrating an example of update management information;

FIG. 18 is a diagram illustrating an example of information items that are written into a BUD and information items that are not written into the BUD;

FIG. 21 is a diagram illustrating an example (continued) of the polling check;

FIG. 22 is a diagram illustrating an example (continued) of the polling check;

FIGS. 23A and 23B are diagrams illustrating output examples of the subscription;

DESCRIPTION OF EMBODIMENTS

Hereinafter, the embodiments are described with reference to the drawings.

First Embodiment

Figure 1:
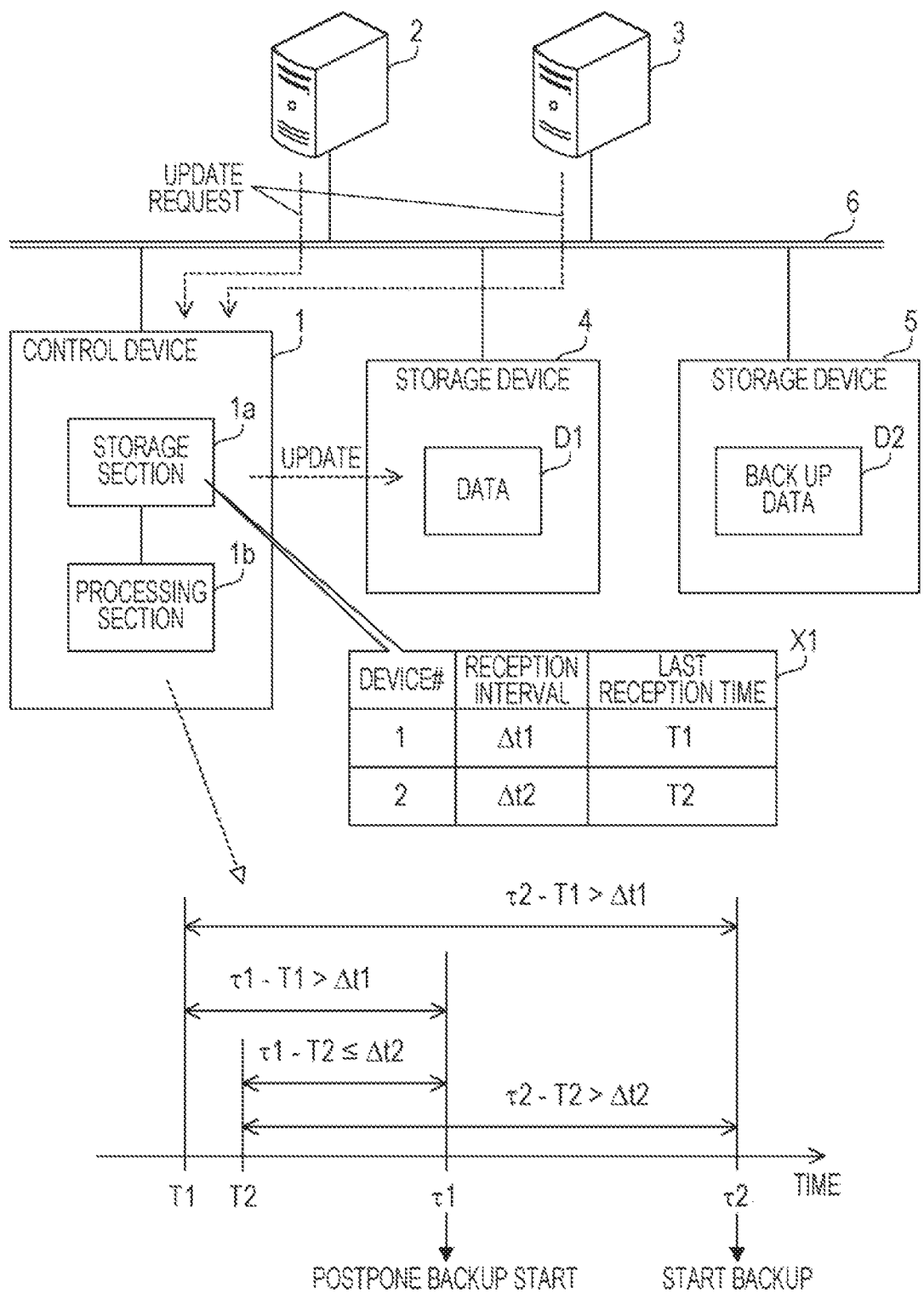
FIG. 1 is a diagram illustrating an example of an information processing system in a first embodiment.

FIG. 1 is a diagram illustrating an example of an information processing system in a first embodiment. The information processing system in the first embodiment includes a control device 1, host devices 2 and 3, and storage devices 4 and 5. The control device 1, the host devices 2 and 3, and the storage devices 4 and 5 are connected to a network 6. One of or both of the storage devices 4 and 5 may be incorporated in the control device 1.

The host devices 2 and 3 update data D1 stored in the storage device 4 via the network 6. Specifically, each of the host devices 2 and 3 issues a series of update requests for the data D1. The control device 1 receives the update request and updates the data D1 stored in the storage device 4 in response to the update request.

The data D1 may be a set of data elements used for processing by each of host devices 2 and 3 or a set of data elements used for predetermined processing by the control device 1. As an example of the latter, it is conceivable that the control device 1 performs an event notification function in an operation management in the system. In that case, the data D1 may be the setting information of the event notification to the host devices 2 and 3 by the control device 1 (for example, information designating a notification target event and a notification destination).

The host devices 2 and 3 have identification information (referred to as device #). The device # of the host device 2 is "1". The device # of the host device 3 is "2". The update requests issued by the host devices 2 and 3 include the device # of each of the host devices 2 and 3 or information that may be associated with the device # by the control device 1.

The control device 1 performs backup processing (sometimes simply referred to as backup) on the data D1 stored in the storage device 4. Specifically, the control device 1 generates backup data D2 corresponding to the data D1 by duplicating the data D1 stored in storage device 4. Then, the control device 1 stores the backup data D2 in the storage device 5. Here, the control device 1 provides a function of controlling the performance timing of the backup. The control device 1 includes a storage section 1a and a processing section 1b. The processing section 1b is a processor.

The storage section 1a may be a volatile storage device such as a random access memory (RAM) or a non-volatile storage device such as a hard disk drive (HDD) or a flash memory. The processing section 1b may be at least one of a central processing unit (CPU), a digital signal processor (DSP), an application specific integrated circuit (ASIC), or a field programmable gate array (FPGA), or any combination thereof. The processing section 1b may be a processor that executes a program. The "processor" may include a set of a plurality of processors (multiprocessor).

The storage section 1a stores a reception interval and the last reception time of the update request for each host device. For example, a table X1 is stored. The table X1 includes fields such as the device #, the reception interval, and the last reception time. The device # is registered in the field of the device #. The reception interval of the update request is registered in the field of the reception interval. The last reception time (latest reception time) of the update request is registered in the field of the last reception time. For example, in the table X1, the reception interval Δt1 and the last reception time T1 are registered for the device #1 (host device 2). In addition, in the table X1, the reception interval Δt2 and the last reception time T2 are registered for the device #2 (host device 3).

The processing section 1b receives update requests issued by each of the host devices 2 and 3 and records the reception interval and the last reception time in the storage section 1a for each host device. Specifically, the processing section 1b registers the reception interval and the last reception time of the update requests by each of the host devices 2 and 3 in the table X1 in association with the device #. In addition, the processing section 1b updates the data D1 stored in the storage device 4 in response to the update request.

For example, a case where the processing section 1b receives the update request at a time T1 with the host device 2 as a transmission origin, is considered. The processing section 1b assumes that the time T1 is the last reception time by the host device 2 (current reception time). The processing section 1b assumes that a time difference between the previous reception time and the current reception time T1 is the reception interval of the update request from the host device 2.

At this time, when the reception interval of current time is longer than the reception interval obtained up to the previous time for the host device 2, the processing section 1b may adopt the reception interval of current time as the reception interval Δt1 of the host device 2. In addition, when the reception interval of current time is shorter than the reception interval obtained up to the previous time, and when the reception interval acquired up to the previous time is equal to the reception interval of current time, the reception interval obtained up to the previous time may be adopted as the reception interval Δt1 of the host device 2. That enables an interruption in a series of update requests from the host device 2 to be appropriately detected in the processing described below. Alternatively, the processing section 1b may use a statistical value of the reception interval of the update request from the host device 2 as the reception interval of the update request from the host device 2. As the statistical value, for example, a percentile value (90 percentile value) or average values (or values obtained by adding errors to the average values) may be considered.

Similarly, the processing section 1b acquires a reception interval Δt2 and a last reception time T2 of the update request for the host device 3, and registers the reception interval Δt2 and the last reception time T2 in the table X1. Here, the time T2 is assumed to be the future time than the time T1.

The processing section 1b compares the elapsed time from the last reception time to the relevant timing and the reception interval at the certain timing for each host device. The processing section 1b starts the backup in response to the comparison result for each host device. The "certain timing" is asynchronous (not synchronized) with the data update according to the update request. For example, the "certain timing" may be a periodic timing, or may be a timing at which another device gives an instruction to check the start of backup. The certain timing is a candidate timing of the start of backup. As an example, a first timing is time τ1. As one more example, a second timing is a time τ2. The time τ2 is a future time than the time τ1.

Specifically, the processing section 1b compares the elapsed time from the last reception time to the time τ1 and the reception interval at the time τ1 with reference to the table X1 stored in storage section 1a for each of the host devices 2 and 3.

That is, the processing section 1b compares the time difference (referred to as τ1−T1) from the last reception time T1 to the time τ1 and the reception interval Δt1 for the host device 2. Here, it is assumed that τ1−T1>Δt1. In addition, the processing section 1b compares the time difference τ1−T2 from the last reception time T2 to the time τ1 and the reception interval t2 for the host device 3. Here, it is assumed that τ1−T2Δt2.

The processing section 1b determines whether or not to start the backup for the data D1 according to the comparison result τ1−T1>Δt1 for the host device 2 and the comparison result τ1−T2Δt2 for the host device 3. In a case of this example, processing section 1b postpones the start of the backup of the data D1 (that is, holds the start of the backup at the current timing).

That is because, according to the comparison result τ1−T1Δt2 relating to the host device 3, there is a high possibility that the reception of the series of update requests issued by the host device 3 has not yet been interrupted (a series of updates of the data D1 by the host device 3 is continued). As described above, when it is estimated that update of data D1 by any host device is continued, the processing section 1b postpones the start of the backup. According to the comparison result τ1−T2>Δt1 relating to the host device 2, there is a high possibility that the reception of the series of update requests issued by the host device 2 has been interrupted (a series of updates of the data D1 by the host device 2 is completed).

Next, the processing section 1b compares the elapsed time from the last reception time to the time τ2 and the reception interval for each of the host devices 2 and 3 at the time τ2 with reference to the table X1 stored in the storage section 1a.

That is, the processing section 1b compares the time difference τ2−T1 from the reception time T1 to the time τ2 and the reception interval Δt1 for the host device 2. Here, it is assumed that τ2−T1>Δt1. In addition, the processing section 1b compares the time difference τ2−T2 from the last reception time T2 to the time τ2 and the reception interval Δt2 for the host device 3. Here, it is assumed that τ2−T2>Δt2.

The processing section 1b determines whether or not to start the backup for the data D1 according to the comparison result τ2−T1>Δt1 for the host device 2 and the comparison result τ2−T2>Δt2 for the host device 3. In a case of this example, the processing section 1b immediately starts the backup of data D1.

That is because, according to the comparison result τ2−T1>Δt1 relating to the host device 2 and the comparison result τ2−T2>Δt2 relating to the host device 3, there is a high possibility that the reception of the series of update requests issued by the host devices 2 and 3 has already been interrupted. In this case, it is considered that a series of updates of data D1 by the host devices 2 and 3 has been completed. As described above, when it is estimated that the updates of data D1 by all host devices have been completed, the processing section 1b starts the backup. Then, the processing section 1b generates the backup data D2 corresponding to the data D1 stored in the storage device 4, and stores the backup data D2 in the storage device 5.

In this way, the control device 1 may reduce the frequency of backup by performing the backup at the timing when the update by the host devices 2 and 3 is completed in a squeezing manner. Incidentally, if the frequency of backup is excessive or insufficient, the system may be affected by undesirable effects. For example, it may be considered that the backup of the data D1 is acquired for every update by each of the host devices 2 and 3. However, in this method, the frequency of backup does not increase. Therefore, there is a possibility that other processing (for example, the original task processing by the control device 1, the host devices 2 and 3, and the like) may be affected by the load of the control device 1 and the storage devices 4 and 5 associated with the backup.

Specifically, when the control device 1 responds to the update request after performing the update and backup for the update request, the response time to the update request increases due to the backup time, and thus, performing of the next processing by control device 1 and host devices 2 and 3 may be delayed. Alternatively, the resource may be locked by the storage device 5 into which the backup data D2 is written, and a waiting time may occur in the task processing on the host devices 2 and 3 that perform log writing or the like into the storage device 5.

On the other hand, for example, it is also considered that the backup of data D1 is performed at a scheduled time. In this method, the frequency of backup may be reduced compared to the case of performing the backup for every update request. However, on the other hand, there is a high possibility that the currently acquired backup data D2 is not the backup data corresponding to the data in a latest state. In this case, when a failure of the storage device 4 or the like occurs, there is a high possibility that the data D1 may not be returned to the latest state when restoring the data D1 from the backup data D2, and thus, there is a concern that the data D1 may not be adequately preserved.

Therefore, the control device 1 starts the backup of the data D1 at the timing when the issuance of the series of update requests is completed by each of the host devices 2 and 3, based on the reception interval of a series of update requests of data D1 issued by host devices 2 and 3 and the last reception time.

In this way, it is possible to efficiently acquire the backup data D2 corresponding to the latest state of the data D1 while reducing the frequency of backup. While it is determined that the data D1 is being updated by at least one host device among a plurality of host devices, the control device 1 holds the backup of the data D1. The reason thereof is as described below.

Foe example, if the backup data D2 is acquired although the data D1 is being updated by the host device 3, the update of the subsequent data D1 by the host device 3 is not reflected in the current backup data D2. Here, among a series of update requests from a certain host device, the time difference between the reception time of the first update request and the reception time of the last update request is usually relatively short, and thus, the possibility that the data D1 is lost due to a failure of the storage device 4 or the like during that short period is considered to be relatively low. For this reason, the control device 1 refrains from acquiring the backup data while any host device is updating the data D1.

However, if the update of the data D1 by a plurality of host devices overlaps, the time for completion of the update by each host device is prolonged. Therefore, the control device 1 immediately starts the backup of the data D1 when the completion of the update of the data D1 by each host device that simultaneously issued a series of update requests for the data D1 is detected. In this way, it is possible to acquire the backup data D2 in a new state at an earlier timing with respect to the update by each host device. As a result, with the backup data D2, it is possible to increase the possibility of restoring the data D1 in a latest state for each host device. In other words, it is possible to achieve both the reduction of frequency of backup and the data preservation by the backup.

In addition, speed-up of the response time to the update request may be achieved by performing the backup at the timing determined asynchronously with the data update by the update request. Furthermore, according to the control device 1, by reducing the frequency of performing the backup, there is also an advantage that the number of times of writing into the storage device 5 may be reduced. Therefore, for example, when a storage device having a limited number of times of writing in a built-in storage element such as a solid state drive (SSD) is used as the storage device 5, there is also an advantage that it is possible to extend the lifetime of the storage device 5.

Hereinafter, the function of controlling the performance of backup is described in detail with a storage device having the function of control device 1 as an example.

Second Embodiment

Figure 2:
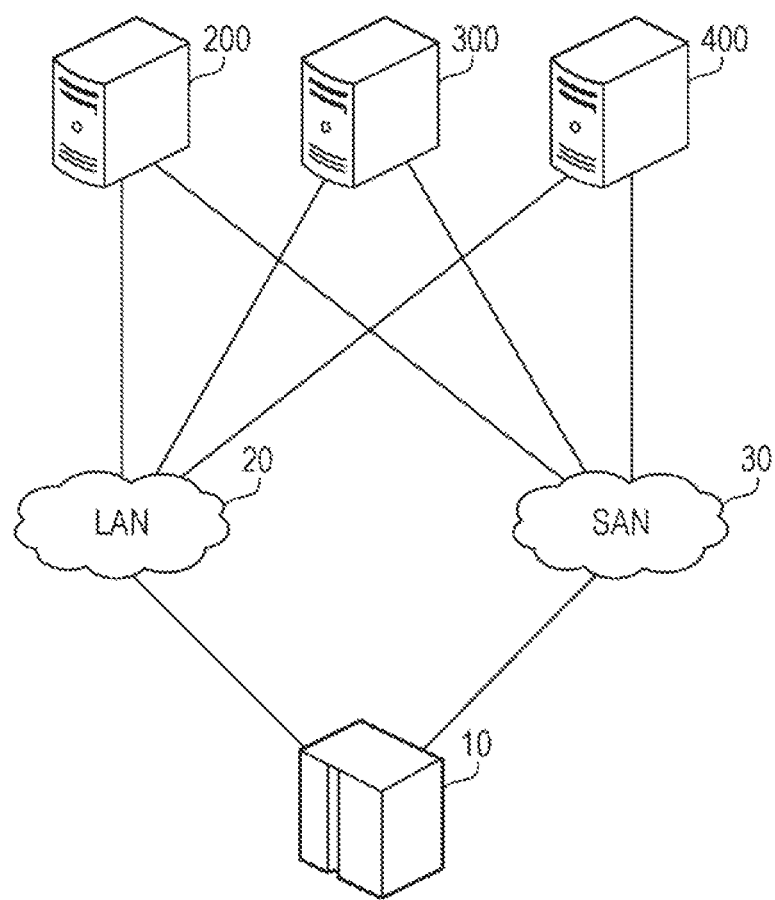
FIG. 2 is a diagram illustrating an example of an information processing system in a second embodiment.

FIG. 2 is a diagram illustrating an example of an information processing system in a second embodiment. The information processing system in the second embodiment includes a storage device 10 and servers 200, 300, and 400. The storage device 10 and the servers 200, 300, and 400 are connected to a local area network (LAN) 20. The LAN 20 is a network used for communication for operation management. In addition, the storage device 10 and the servers 200, 300, and 400 are connected to a storage area network (SAN) 30. The SAN 30 is a network used for accessing the data stored in the storage device 10 from the servers 200, 300, and 400.

The storage device 10 stores various data used for task processing performed by the servers 200, 300, and 400. The storage device 10 may be a device called a storage array or a disk array.

The storage device 10 includes a plurality of storage devices. The storage device is, for example, an HDD or an SSD. The storage device 10 creates logical volumes using a plurality of storage devices according to a technology of redundant arrays of inexpensive disks (RAID) and provides the logical volumes to the servers 200, 300, and 400. In addition, the storage device 10 notifies the servers 200, 300, and 400 of an occurrence of a predetermined event. As an example of a notification target event, a fact that a new logical volume may be used in the storage device 10 or a change in the progress of the data copy processing in the storage device 10 may be considered. The notification target event is selected by the servers 200, 300, and 400.

The servers 200, 300, and 400 are server computers that perform block access to task data stored in the storage device 10 via the SAN 30, and execute predetermined task processing using the task data.

In addition, the servers 200, 300, and 400 perform setting for the notification target event by the storage device 10 via the LAN 20. The contents of the events notified by the servers 200, 300, and 400 are different from each other. The servers 200, 300, and 400 individually set the information on the event to be notified and the information on the notification destination into the repository of the storage device 10.

Here, the storage device 10 notifies of the event by using a device configuration change notification function (sometimes referred to as "indication function") of storage management initiative-specification (SMI-S). The SMI-S is a standard agreement developed and maintained by Storage Networking Industry Association (SNIA), and has a purpose of improving interoperability of storage devices in different vendors or in heterogeneous systems.

In the indication function of SMI-S, the servers 200, 300, and 400 perform the setting of the information with respect to the repository of the storage device 10 according to the SMI-S standard. The specific setting information is as follows.

The first setting information is the internet protocol (IP) address of the notification destination server and the name of the notification destination server. Sometimes, the notification destination server may be referred to as a listener. In addition, the name of the listener may be referred to as a listener name.

The second setting information is a notification target event. Sometimes, the notification target event may be referred to as a filter. The third setting information is mapping of the listener (a notification destination server) and the filter. The mapping of the listener and the filter may be referred to as a subscription.

The first, the second, and the third setting information are collectively referred to as indication information. The servers 200, 300, and 400 issue an update request for the indication information stored in the repository of the storage device 10. The servers 200, 300, and 400 transmit the update request to the storage device 10 via the LAN 20.

Figure 3:
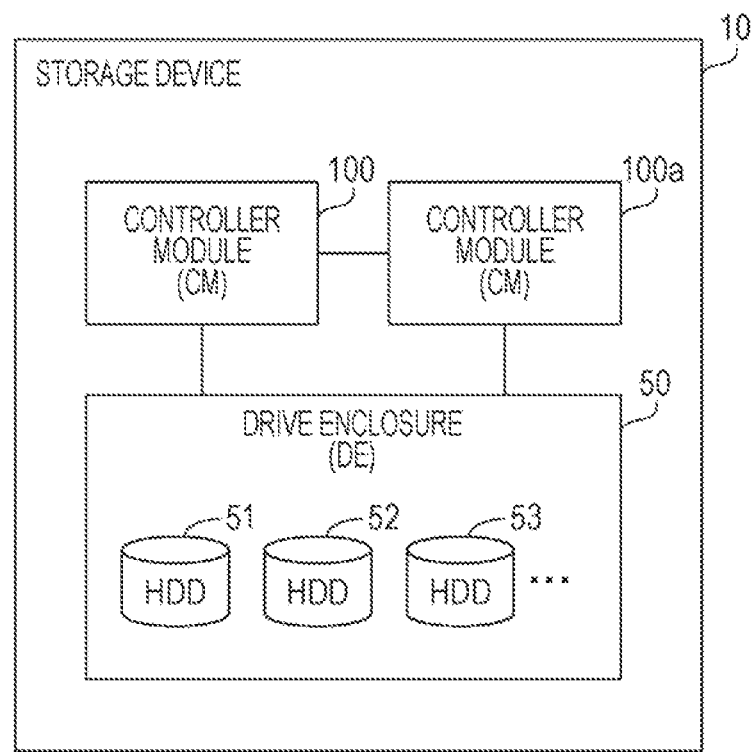
FIG. 3 is a diagram illustrating a hardware example of a storage device.

FIG. 3 is a diagram illustrating a hardware example of a storage device. A storage device 10 has controller modules (CM) 100 and 100a, and a drive enclosure (DE) 50. The CMs 100 and 100a and DE 50 are connected to each other by the internal bus in the storage device 10.

The CMs 100 and 100a are control devices for controlling the block access to the storage device accommodated in the DE 50. Sometimes, the CMs 100 and 100a are referred to as a storage control device or simply as a controller.

The CMs 100 and 100a provided the indication function. For example, any one of the CMs 100 and 100a may provide the indication function in the storage device 10. Alternatively, both the CMs 100 and 100a may provide the indication function in the storage device 10. For example, when the CM 100 is in failure, the CM 100a may be a substitute for the CM 100 for the indication function. In the example in the second embodiment, it is assumed that the CM 100 is in charge of providing the indication function in the storage device 10 (the CM 100a may also provide an indication function similarly to the CM 100).

A plurality of HDDs are accommodated in the DE 50. For example, the DE 50 includes HDDs 51, 52, and 53. The DE 50 may include a plurality of other types of storage devices such as SSDs in addition to or instead of the HDDs.

Here, the indication information is stored in a predetermined volatile memory included in the CM 100. For this reason, when the restart of the CM 100 due to a power failure a failure, or a power ON and OFF of the CM 100 occurs, the indication information is erased. Therefore, the CM 100 duplicates the indication information stored in the volatile memory and performs backup to the non-volatile memory. In this way, even if the restart of the CM 100 or power ON and OFF of the CM 100 occurs, the indication information may be restored from the non-volatile memory. The CM 100 provides a function of controlling the start timing of backup of the indication information.

Figure 4:
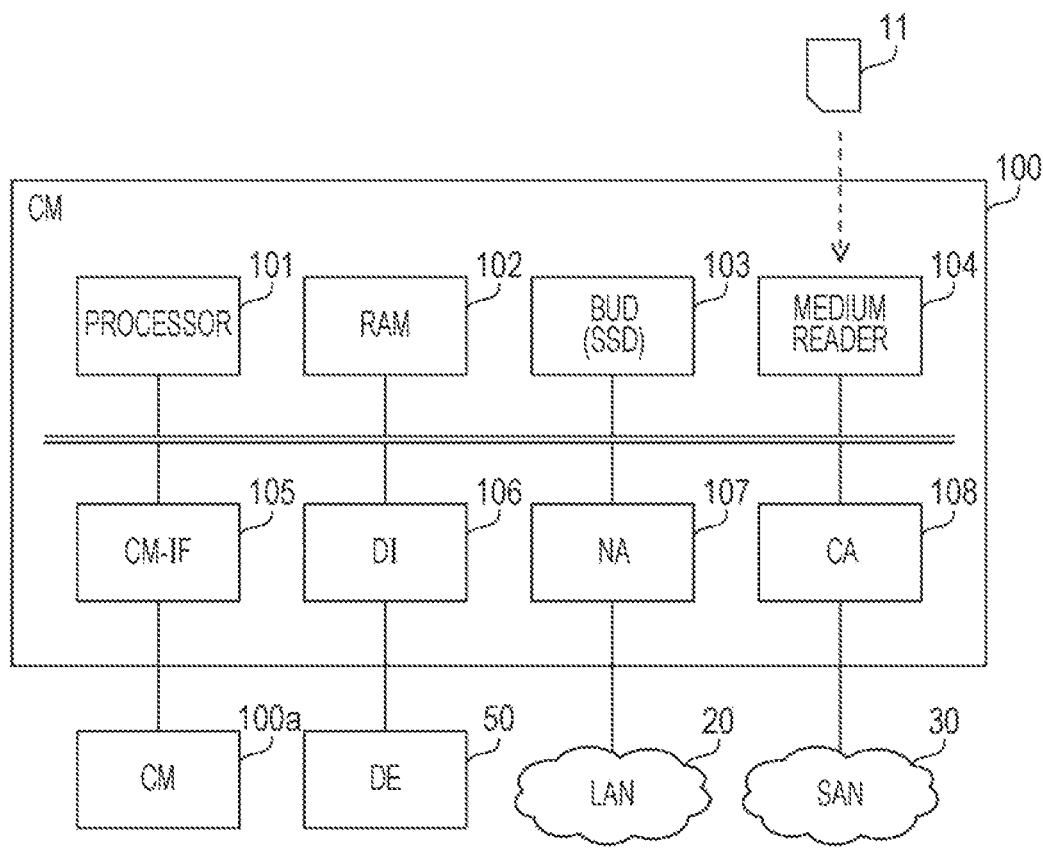
FIG. 4 is a diagram illustrating a hardware example of a controller module (CM)

FIG. 4 is a diagram illustrating a hardware example of the CM. The CM 100 includes a processor 101, a RAM 102, a boot-up and utility device (BUD) 103, a medium reader 104, a CM-interface (IF) 105, a drive interface (DI) 106, network adapter (NA) 107 and a channel adapter (CA) 108. These hardware elements are connected to the internal bus in the CM 100. The CM 100a may also be realized by the same hardware as the CM 100.

The processor 101 is the hardware for controlling information processing by the CM 100. The processor 101 may be a multiprocessor. The processor 101 is, for example, a CPU, a DSP, an ASIC, an FPGA, or the like. The processor 101 may be a combination of two or more elements among the CPU, the DSP, the ASIC, the FPGA, and the like.

The RAM 102 is a main storage device of the CM 100. The RAM 102 is a volatile semiconductor memory. As the RAM 102, for example, a static RAM (SRAM), a dynamic RAM (DRAM), or the like is used. The RAM 102 temporarily stores at least a part of an OS (firmware) program to be executed by the processor 101. In addition, the RAM 102 stores various data used for the processing by the processor 101.

The BUD 103 is an auxiliary storage device of the CM 100. The BUD 103 is a non-volatile semiconductor memory. An SSD is used as the BUD 103. The BUD 103 stores the OS program (including firmware), various data, and the like. The BUD 103 is also used for storing the backup data corresponding to the data stored in the RAM 102.

The medium reader 104 is a device for reading a program and data stored in a recording medium 11. For example, a non-volatile semiconductor memory such as a flash memory card may be used as the recording medium 11. For example, the medium reader 104 may also store the programs and data read from the recording medium 11 in the RAM 102 and the BUD 103 according to a command from the processor 101.

The CM-IF 105 is an interface for connecting the CM 100 to the CM 100a. The CM 100 may perform data access in cooperation with the CM 100a using the CM-IF 105. For example, the CM 100 may be used as an active system and the CM 100a may be used as a standby system. Alternatively, both the CMs 100 and 100a may be used as the active system, and the data access may be performed in a distributed manner. In either case, it is possible to continue the data access in the event of failure in one CM, and thus, the user's task may be suppressed from being stopped.

A DI 106 is an interface for communicating with the DE 50. For example, an interface such as a serial attached SCSI (SAS) may be used as the DI 106. An NA 107 is a communication interface for communicating with the servers 200, 300, and 400 via the LAN 20. For example, an Ethernet® interface may be used as the NA 107.

A CA 108 is a communication interface that communicates with the servers 200, 300, and 400 via the SAN 30. For example, a fibre channel (FC) interface may be used as the CA 108. The CA 108 is used for the block access from the servers 200, 300, and 400 to the DE 50. An interface other than the FC (for example, internet small computer system interface (iSCSI)) or the like) may be used as the CA 108.

Figure 5:
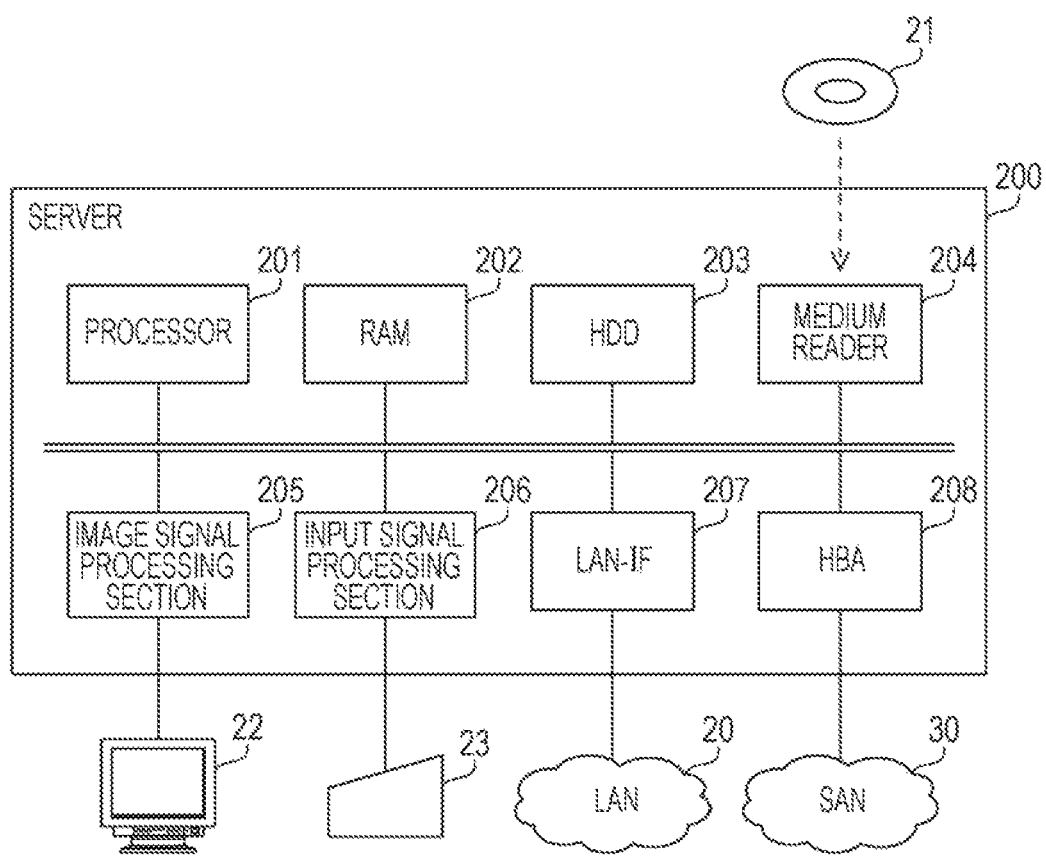
FIG. 5 is a diagram illustrating a hardware example of a server.

FIG. 5 is a diagram illustrating a hardware example of a server. A server 200 includes a processor 201, a RAM 202, an HDD 203, a medium reader 204, an image signal processing section 205, an input signal processing section 206, a LAN-IF 207 and a host bus adapter (HBA) 208. Each of the hardware elements is connected to the bus of the server 200. The servers 300 and 400 may also be realized using the hardware similar to those of the server 200.

The processor 201 is hardware for controlling the information processing by the server 200. The processor 201 may be a multiprocessor. The processor 201 is, for example, a CPU, a DSP, an ASIC, or an FPGA. The processor 201 may be a combination of two or more elements such as the CPU, the DSP, the ASIC, and the FPGA.

The RAM 202 is a main storage device of the server 200. The RAM 202 temporarily stores at least a part of an OS program or an application program to be executed by the processor 201. In addition, the RAM 202 stores various data used for the processing by the processor 201.

The HDD 203 is an auxiliary storage device of the server 200. The HDD 203 magnetically writes and reads data into and from the built-in magnetic disk. The HDD 203 stores the OS program, the application program, and various data. The server 200 may include other type auxiliary storage device such as an SSD or a plurality of auxiliary storage devices in addition to the HDD 203 or instead of the HDD 203.

The medium reader 204 is a device that reads the programs and the data recorded in the recording medium 21. For example, a magnetic disk such as a flexible disk (FD) or an HDD, an optical disk such as a compact disc (CD) or a digital versatile disc (DVD), or a magneto-optical (MO) disk may be used as the recording medium 21. In addition, for example, a non-volatile semiconductor memory such as flash memory card may be used as the recording medium 21. The medium reader 204 stores the program or data read from the recording medium 21 in the RAM 202 or the HDD 203 according to a command from the processor 201, for example.

The image signal processing section 205 outputs an image to a display 22 connected to the server 200 according to the command from the processor 201. A cathode ray tube (CRT) display, a liquid crystal display, and the like may be used as the display 22.

The input signal processing section 206 acquires an input signal from an input device 23 connected to the server 200 and outputs the input signal to the processor 201. For example, pointing devices such as a mouse or a touch panel, or a keyboard may be used as the input device 23.

The LAN-IF 207 is a communication interface that communicates with the storage device 10 via the LAN 20. The LAN-IF 207 may be a wired communication interface or may be a wireless communication interface.

The HBA 208 is a communication interface that communicates with the storage device 10 via the SAN 30. An FC interface may be used as the HBA 208. It is noted that an interface other than the FC interface, such as an iSCSI interface, may be used as the HBA 208.

Figure 6:
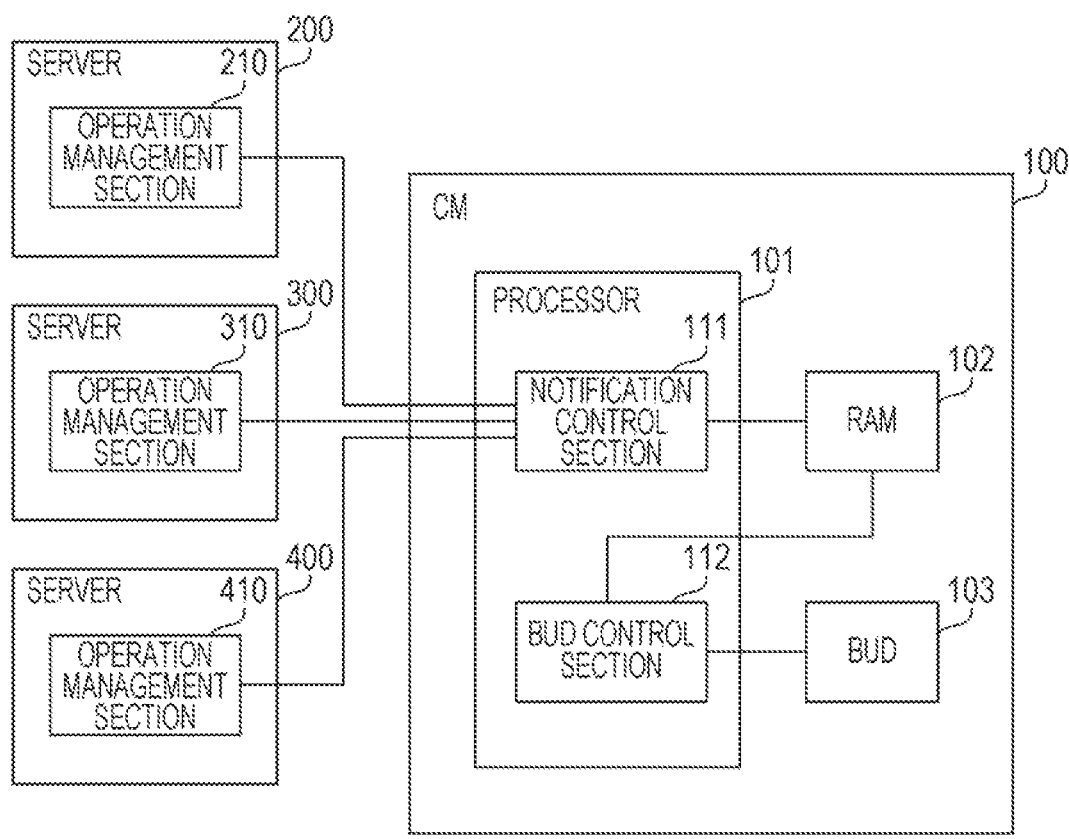
FIG. 6 is a diagram illustrating an example of a function of the CM.

FIG. 6 is a diagram illustrating an example of a function of the CM. The CM 100 includes a notification control section 111 and a BUD control section 112. The notification control section 111 and the BUD control section 112 are realized by the processor 101 executing a program stored in the RAM 102.

The notification control section 111 receives an update request for the indication information from the servers 200, 300, and 400, respectively. The indication information is stored in the RAM 102. A part of a storage area of the RAM 102 has a role for the repository for storing the indication information. The notification control section 111 updates the indication information stored in the RAM 102 in response to the update request.

Here, in FIG. 6, operation management sections 210, 310, and 410 are illustrated. The operation management section 210 performs an operation management function generated by the processor included in the server 200. The operation management section 310 performs an operation management function generated by the processor included in the server 300. The operation management section 410 performs an operation management function generated by the processor included in the server 400. The operation management sections 210, 310, and 410 are realized the processors included in the servers 200, 300, and 400 respectively executing predetermined programs stored in the RAM of the servers 200, 300, and 400 respectively.

For example, each of the operation management sections 210, 310, and 410 issues update requests for the indication information and transmits the update request to the CM 100. The operation management sections 210, 310, and 410 may individually register the monitoring target events (filters) in the indication information. The monitoring target event may be given to the operation management sections 210, 310, and 410 in advance (for example, the monitoring target event may be registered in advance in the storage devices of the servers 200, 300, and 400). Alternatively, the operation management sections 210, 310, and 410 may allow the user to select the monitoring target event later.

The notification control section 111 monitors the update requests for the indication information from the servers 200, 300, and 400. The notification control section 111 acquires a reception interval and a last reception time of the update request from the servers 200, 300, and 400 respectively by monitoring the update request. The notification control section 111 stores the acquired reception interval and the last reception time in the RAM 102 in correspondence with identification information (for example, a listener name) of the servers 200, 300, and 400 respectively.

When an occurrence of the predetermined event is detected in storage device 10, the notification control section 111 notifies the listener of the notification target of the event of the occurrence of the event according to the setting content of the indication information.

The BUD control section 112 performs backup of the indication information stored in the RAM 102. Specifically, the BUD control section 112 compares an elapsed time from the last reception time of the update request to the timings and the reception interval of the update request for each server based on the information stored in the RAM 102 at a certain timing. The BUD control section 112 determines whether or not to start the backup according to the result of the comparison for each server.

When it is determined to start the backup, the BUD control section 112 generates the backup data corresponding to the indication information by duplicating the indication information stored in the RAM 102. The BUD control section 112 stores the generated backup data in the BUD 103. In addition, when it is determined not to start the backup, the BUD control section 112 holds the starting of the backup at the current timing and postpones the starting of the backup to the next timing.

Here, it is assumed that a candidate timing for the BUD control section 112 to start the backup is a timing specified in a predetermined cycle. However, the candidate timing for the BUD control section 112 to start the backup may be determined by another method. For example, the timing for the BUD control section 112 to start the backup may be a timing instructed by another device to confirm the start of the backup.

Figure 7:
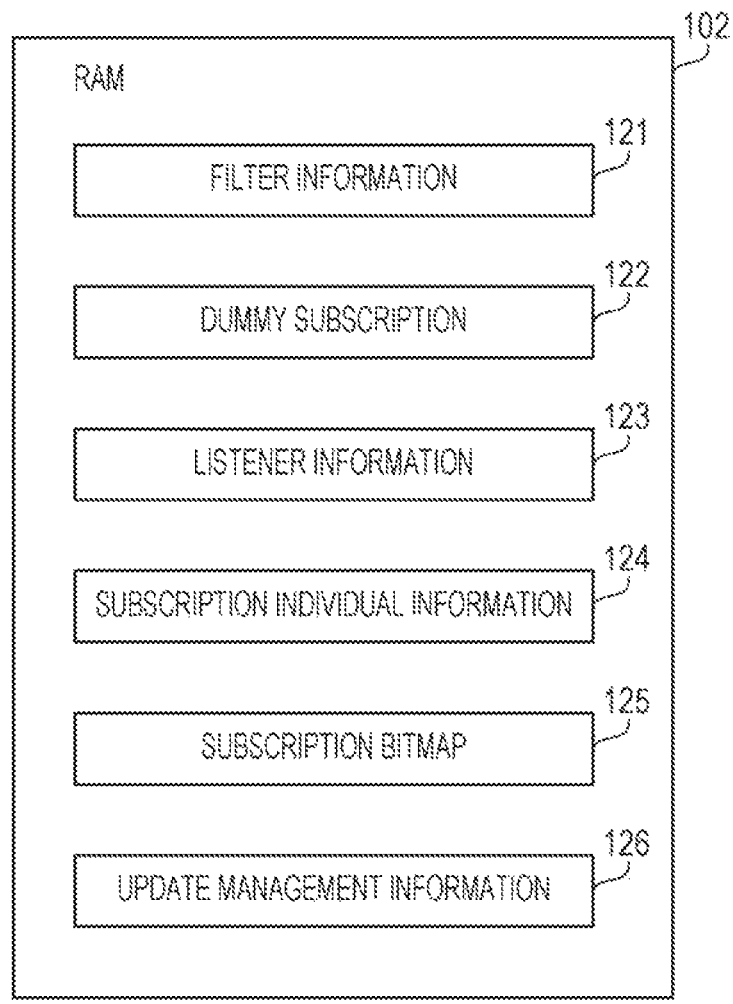
FIG. 7 is a diagram illustrating an example of information items stored in a RAM of the CM.

In some cases, the BUD control section 112 restores the indication information in the RAM 102 based on the backup data stored in the BUD 103. FIG. 7 is a diagram illustrating an example of information items stored in the RAM of the CM. The RAM 102 stores filter information 121, a dummy subscription 122, listener information 123, subscription individual information 124, subscription bitmap 125 and update management information 126.

The filter information 121 is information indicating a list of events that may be set as a notification target by an indication function. An example of such an event includes a new registration of the logical volume in the storage device 10, as described above. The filter information 121 is expressed using, for example, a description format called a model-pass format using an extensible markup language (XML). The content of the filter information 121 is predefined by the firmware of the storage device 10. The content of the filter information 121 may differ depending on the version of the firmware.

The dummy subscription 122 is information used to describe the subscription. The dummy subscription 122 is expressed in the model-pass format. Here, the subscription includes a filter-unique description part and a listener-specific description part. The dummy subscription 122 is the filter-unique description part in the subscription. The dummy subscription 122 includes a placeholder for replacing certain information to predetermined listener-specific information (such as information on the listener name and the registration time). The placeholder is expressed in a predetermined keyword format. In this example, the keyword format is a description format that encloses a character string with "%" (a percent sign) such as "%×%".

The dummy subscriptions 122 exist as many as the number of filters.

The listener information 123 is information indicating the correspondence relationship of an IP address and the listener name in the notification destination server. The listener information 123 is expressed in the model-pass format. The records of the listener information 123 are created as many as the number of listeners. The record of the listener information 123 is updated or deleted in response to the update request from the servers 200, 300, and 400.

The subscription individual information 124 is information indicating the correspondence relationship of the listener name and a registration time of the subscription. The records of the subscription individual information 124 are created as many as the number of the subscriptions (the number of pairs of the listener name and the filter). The record of the subscription individual information 124 is updated or deleted by the notification control section 111 in response to the update request from the servers 200, 300, and 400.

The subscription bitmap 125 is mapping information between the listener name and the filter. The subscription bitmaps 125 are created as many as the number of listeners. The subscription bitmap 125 is expressed in a bitmap format. The subscription bitmap 125 is updated or deleted by the notification control section 111 in response to the update request from the servers 200, 300, and 400.

The update management information 126 is information for managing the update of the indication information. The update management information 126 includes a last update time and an update interval of the indication information for each listener.

The last update time is the last update time (the latest update time) of the indication information by the corresponding listener. The last time at which the update request for the indication information by the corresponding listener was received (last reception time) may be regarded as the last update time. The last update times are registered as many as the number of listeners. The last update time is updated or deleted by the notification control section 111 in response to the update request from the servers 200, 300, and 400.

The update interval is the update interval of the indication information by the corresponding listener. A value set for the update interval is a maximum value of the update interval measured in the past. The update intervals are registered as many as the number of listeners. The update interval is updated or deleted by the notification control section 111 in response to the update request from the servers 200, 300, and 400.

In addition, the update management information 126 includes a repository update flag. The repository update flag is a flag indicating the presence or absence of the update for the entire indication information. A "TRUE" in the repository update flag indicates that the update is present from the time point of previous backup. A "FALSE" in the repository update flag indicates that the update is not present from the time point of previous backup. The repository update flag is set to "TRUE" by the notification control section 111 according to the update of the indication information by the servers 200, 300, and 400. The repository update flag is set to "FALSE" by the BUD control section 112 when the backup of the indication information is completed.

Next, data structure of each information illustrated in FIG. 7 is described in detail. FIG. 8 is a diagram illustrating an example of the filter information. The filter information 121 includes a filter number and a notification target event field. The number that identifies the filter is registered in the filter number field. The content of the notification target event is registered in the notification target event field.

For example, the information indicating that the filter number is "1" and the notification target event is "when a RAID group or a template registration is completed" is registered in the filter information 121. This means that the notification target event indicated in the filter number "1" is an event in which the RAID group or the template registration is completed. The "thin-pro" here is an abbreviation of thin provisioning. The "thin-pro pool" is a collection of shared storage resources for the servers 200, 300, and 400. "Thin-pro pool registration completed" means that a new thin-pro pool is registered in the storage device 10.

As a result of registering new RAID groups and new thin-pro pools, the servers 200, 300, and 400 may use the new storage resources. The servers 200, 300, and 400 receive the notification of the event, and then, may detect a fact that the new storage resource may be used and may notify the user.

In the filter information 121, events such as "when a volume registration is completed" or "when a state of a copy session is changed" are registered. FIG. 9 is a diagram illustrating an example of the dummy subscription. The dummy subscription 122 is data in an XML format. The dummy subscription 122 includes definitions such as the filter (described on lines 8 to 12), the listener of the notification destination (described in lines 13 to 16), and a notification policy (described in lines 17 to 19). However, in a position for describing the listener name (line 14), a keyword "% a %" is set.

In addition, the dummy subscription 122 includes a subscription update time (line 20) by the listener and an application start time (line 21) by the listener. In a position for describing these times, a keyword "% b %" is set.

As described above, the dummy subscription 122 includes the keyword set to the listener-specific description position including the filter-unique description position (the listener name, the update time, and the application start time). The keywords differ from each other for each filter (dummy subscription).

The dummy subscription 122 is stored in the RAM 102 in association with the identification information of the filter (for example, the filter number described above). In addition, the description of the dummy subscription 122 is a description for the filter in advance. Therefore, the notification control section 111 may generate dummy subscription 122 based on the filter information 121.

FIG. 10 is a diagram illustrating an example of listener information. Here, the listener information 123 is data in an XML format. The listener information 123 includes definitions of the listener name (line 14), and an IP address of the listener (line 15). The information corresponding to one listener corresponds to one record of listener information 123.

Here, the listener name of the server 200 is assumed to be "Listener1". The listener name of the server 300 is assumed to be "Listener2". The listener name of the server 400 is assumed to be "Listener3". The listener names are respectively given to the servers 200, 300, and 400 in advance.

FIG. 11 is a diagram illustrating an example of the subscription individual information. The subscription individual information 124 includes a key word identifier field and a value field. An identifier of the keyword (referred to as the keyword identifier) set in the dummy subscription is registered in the key word identifier field. The keyword identifier is expressed by a combination of information that distinguishes the listener (for example, a pair of "L" character and a numeric value such as "L1") and a keyword (for example, "L1% a %"). A set of the set values for each keyword included in the dummy subscription 122 is specified by the information that distinguishes the listener in the keyword identifier. A set value corresponding to the keyword identifier is registered in the value field.

For example, information in which the keyword identifier is "L1% a %", and the value is "Listener1" is registered in the subscription individual information 124. In addition, information in which the keyword identifier is L1% b %", and the value is "20160630060510.116666+000" is registered in the subscription individual information 124. These are the set of the values set in the keywords "% a %" and "% b %" for dummy subscription 122. That is, the keyword "% a %" is replaced by the "Listener1" and the keyword "% b %" is replaced by the "20160630060510.116666+000". The information representing the set of the values corresponds to one record of the subscription individual information 124.

For example, a set of other values to be set in the dummy subscription 122 (for example, a set of values corresponding to the keyword identifier "L2% a %" and "L2% b %") is also registered in the subscription individual information 124. In addition, for another dummy subscription as well, a correspondence relationship between the keyword identifier and the value is similarly registered in the subscription individual information 124.

FIG. 12 is a diagram illustrating an example of the subscription bitmap. The subscription bitmap 125 includes bitmaps 125a, 125b, and 125c. The bitmap 125a is the subscription bitmap for the server 200 and is in association with the listener name "Listener1". The bitmap 125b is the subscription bitmap for the server 300 and is in association with the listener name "Listener2". The bitmap 125c is the subscription bitmap for the server 400 and is in association with the listener name "Listener3".

Each digit of the bitmaps 125a, 125b, and 125c is in association with the filter number. For example, each digit of the bitmaps 125*a*, 125*b*, and 125*c* is in association with the filter numbers "1", "2", and "3", . . . in an order from the highest digit to the lowest digit and in an ascending order of the filter number. When the bit value of a digit is "1", it indicates that a notification of the event corresponding to the corresponding filter number is to be performed using the indication function. In addition, when the bit value of a digit is "0", it indicates that a notification of the event corresponding to the corresponding filter number is not to be performed using the indication function. The initial value of each bit of the bitmaps 125*a*, 125*b*, and 125*c* is "0".

In addition, the number of digits in the bitmaps 125*a*, 125*b*, and 125*c* is fixed by the firmware version. When the firmware version is changed, the number of digits in the bitmaps 125*a*, 125*b*, and 125*c* may be changed because the number of filters may also be changed.

For example, in the example of the bitmap 125*a*, the bit value of the digit corresponding to the filter number "1" is "1". This indicates that a notification of the event corresponding to the filter number "1" is to be performed for the server 200.

In addition, in the example of the bitmap 125*a*, the bit value of the digit corresponding to filter number "6" is "0". This indicates that a notification of the event corresponding to the filter number "6" is not to be performed for the server 200.

FIG. 13 is a diagram illustrating an example of the update management information. The update management information 126 includes an item name field and a value field. A name of a set value for update management is registered in the item name field. The set value is registered in the value field.

For example, in the update management information 126, a value "TRUE" is registered for the item name "repository update flag". This indicates that the set value for the repository update flag is "TRUE".

In addition, the information indicating that the value is "10:00:04.312" is registered in the update management information 126 for the item name "Listener1 last update time". This indicates that the last update time of the indication information by the server 200 is 10:00:04 seconds 312.

In addition, information such as the value "2035" is registered in the update management information 126 for the item name "Listener1 update interval (msec)". This indicates that the update interval of the indication information by the server 200 is 2035 milliseconds (msec).

Figure 14:
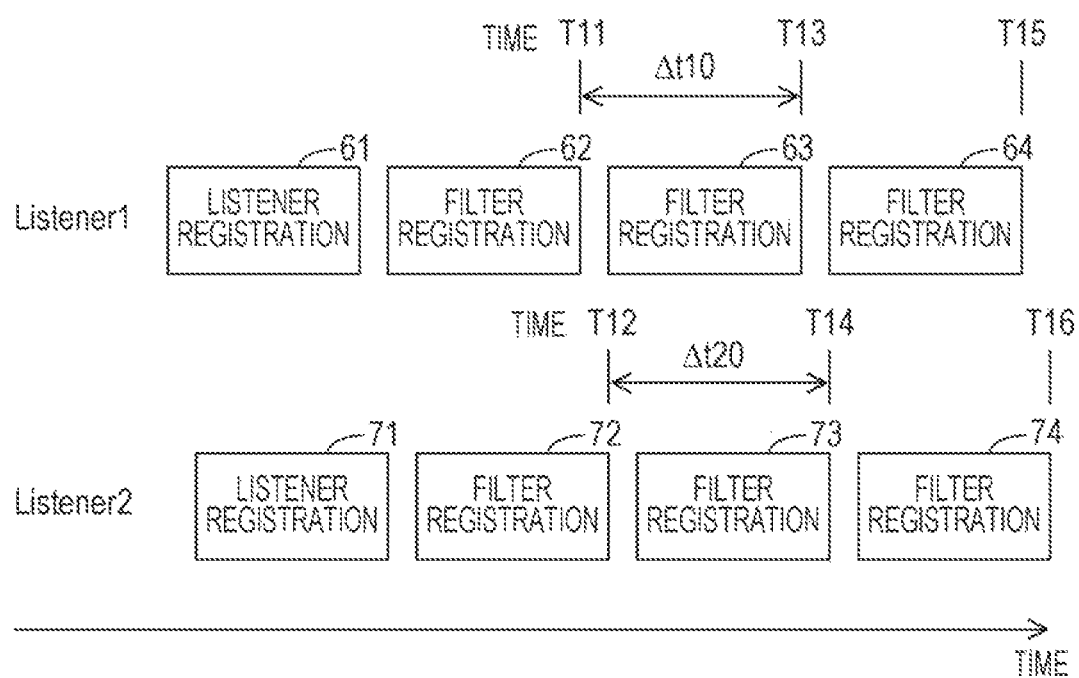
FIG. 14 is a diagram illustrating an example of receiving a series of update requests.

The last update time and the update interval are registered in update management information 126 for other listeners similarly to the server 200. The set value "0" in the update interval represents an invalid value. FIG. 14 is a diagram illustrating an example of receiving a series of update requests. According to the SMI-S protocol, the notification control section 111 receives an update request as follows. First, one update request from each server corresponds to the registration of one listener or the registration of one subscription. Therefore, in a case of receiving a plurality of the registration of subscriptions from a listener, the notification control section 111 receives a plurality of update requests.

Second, generally, the registrations of the listener and the subscription are successively performed for each listener. Third, the reception interval of the update request for each listener depends on a machine performance of each server and the network performance used for communication between each servers. Therefore, it is expected that the notification control section 111 receives the update request at approximately equal intervals for each listener.

Fourth, when there exists a plurality of servers that issue the update requests, in some cases, the notification control section 111 receives the update requests issued by a plurality of servers in a certain period of time in parallel. For example, in a certain period of time, notification control section 111 receives a series of update requests for the indication information from the server 200 (Listener1) and the server 300 (Listener2). In FIG. 14, the direction from the left to the right is the positive direction of the time axis.

The update requests 61, 62, 63, and 64 are a series of update requests received by the notification control section 111 from the server 200 in this order. The update requests 71, 72, 73, and 74 are a series of update requests received by the notification control section 111 from the server 300 in this order. Each update request includes information on the listener name corresponding to the transmission source server and information indicating the update content for the indication information.

For example, the update request 61 is a request for the listener registration for the server 200. The update request 62 is a request for the first filter registration (addition of a filter to be used as a notification target filter) following the update request 61. The update request 63 is a request for the second filter registration. Update request 64 is a request for the third filter registration.

In addition, for example, the update request 71 is a request for the listener registration for the server 300. The update request 72 is the first request for the filter registration following the update request 71. The update request 73 is a request for the second filter registration. The update request 74 is a request for the third filter registration.

In some cases, the notification control section 111 receives an update request for the filter registration or the notification release (filter release) relating to the existing filter. When the existing listener transmits the update request for the filter registration or the filter release, the listener may not transmit the update request for the listener registration before the update request.

The update request for the filter registration or the filter release for each listener may be referred to be the update request for the subscription. In the example in FIG. 14, the time sequences T11, T12, T13, T14, T15, and T16 arranged in time series are illustrated. The time T11 is the reception time of the update request 62. The time T12 is the reception time of the update request 72. The time T13 is the reception time of the update request 63. The time T14 is the reception time of the update request 73. The time T15 is the reception time of the update request 64. The time T16 is the reception time of the update request 74.

In this case, at the time T16, the update interval and the last update time of each listener observed by the notification control section 111 are as follows. For the server 200 (Listener1), the reception interval for the update requests 62 and 63 is longer than the reception interval for the update requests 61 and 62 and the reception interval for the update requests 63 and 64. Accordingly, the update interval $\Delta t10$ by the server 200 is $\Delta t10 = T13 - T11$. In addition, the last update time by the server 200 is the time T15.

For server 300 (Listener2), the reception interval for update requests 72 and 73 is longer than the reception interval for the update requests 73 and 74 and the reception interval for the update requests 71 and 72. Accordingly, the update interval $\Delta t20$ by the server 300 is $\Delta t20 = T14 - T12$. In addition, the last update time by the server 300 is the time T16.

Next, the processing procedure performed by the CM 100 is described. First, the procedure of processing (update request reception processing) for receiving the update request for the indication information from the server 200 by the notification control section 111 is described. Subsequently, the procedure of processing (polling check processing) for acquiring the backup of the indication information by the BUD control section 112 is described.

Figure 15:
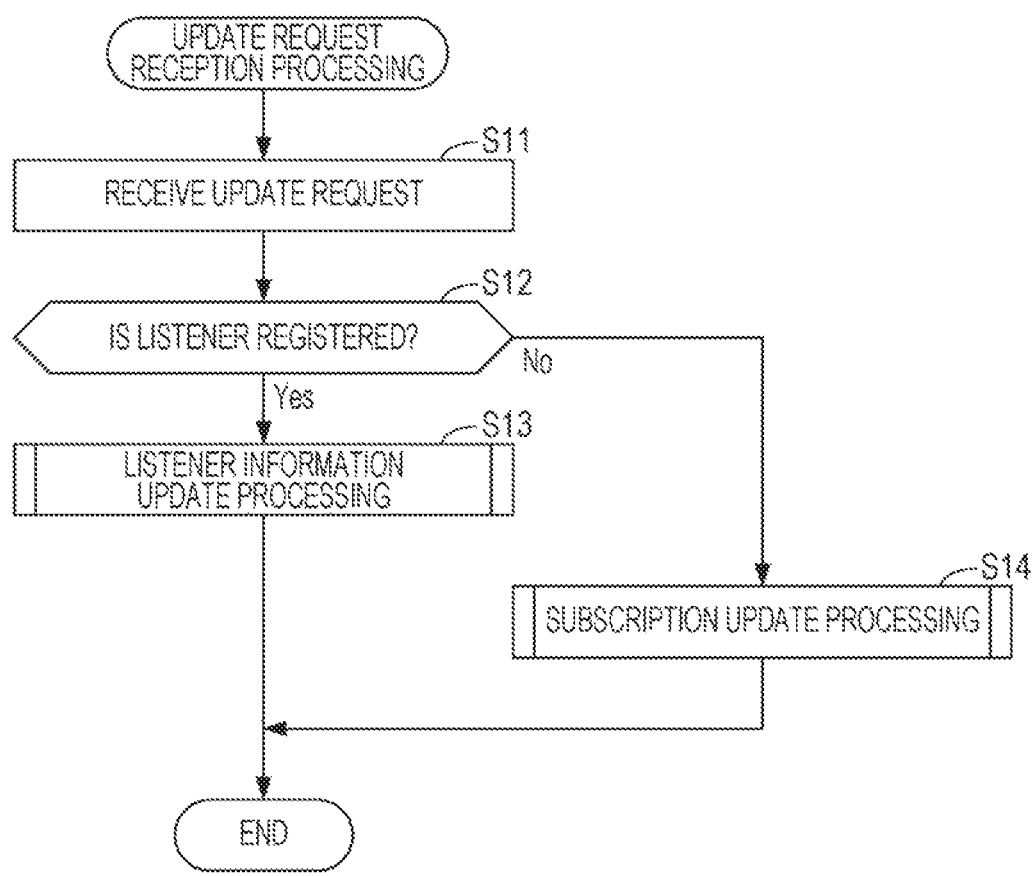
FIG. 15 is a flowchart illustrating an example of update request reception processing.

FIG. 15 is a flowchart illustrating an example of the update request reception processing. Hereinafter, the processing illustrated in FIG. 15 is described along with STEP numbers. (S11) The notification control section 111 receives an update request for indication information from any server.

(S12) The notification control section 111 determines whether or not the received update request is an update request for the registration of the listener. When the received update request is the update request for the registration of the listener, the processing proceeds to STEP S13. When the received update request is not the update request for the registration of the listener (that is, in a case of an update request for the subscription by the already a registered listener), the processing proceeds to STEP S14.

(S13) The notification control section 111 performs the listener information update processing. Details of the listener information update processing are described later. Then, the notification control section 111 ends the processing. (S14) The notification control section 111 performs the subscription update processing. Details of the subscription update processing are described later. Then, the notification control section 111 ends the processing.

Figure 16:
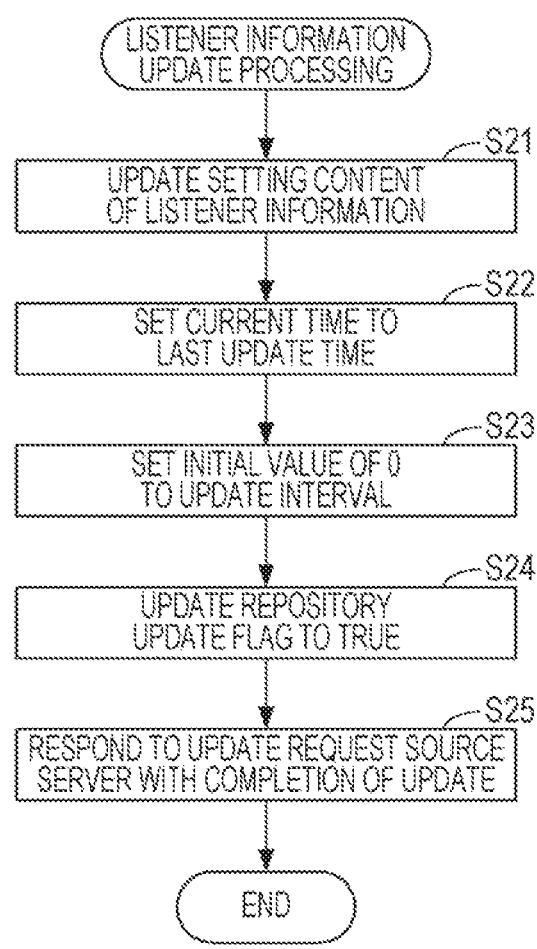
FIG. 16 is a flowchart illustrating an example of listener information update processing.

FIG. 16 is a flowchart illustrating an example of the listener information update processing. Hereinafter, the processing illustrated in FIG. 16 is described along with STEP numbers. The procedure described below corresponds to STEP S13 in FIG. 15.

(S21) The notification control section 111 updates the setting content of the listener information 123 stored in the RAM 102 in response to the update request (including the listener name and the IP address) for the registration of the listener. Specifically, the notification control section 111 adds a new listener setting (including the listener name and the IP address of the listener) to the listener information 123. In addition, the notification control section 111 creates a subscription bitmap (with setting all the bits to an initial value of 0) for the corresponding listener, and stores the subscription bitmap in the RAM 102.

(S22) The notification control section 111 sets the current time to the last update time of the corresponding listener in the update management information 126 stored in the RAM 102. (S23) The notification control section 111 sets an initial value of 0 to the update interval of the corresponding listener in the update management information 126.

(S24) The notification control section 111 sets the repository update flag to TRUE in the update management information 126. When the repository update flag is already TRUE, the notification control section 111 sets TRUE by overwriting.

(S25) The notification control section 111 responds to the update request source server with the completion of the update. As the update request for updating the listener, the notification control section 111 may receive the update request for the existing listener setting as well as a request for adding a new listener setting. In this case, the notification control section 111 performs STEP S22 after performing the update of the listener setting for the listener information 123 (the creation of the bitmap in STEP S21 may not be performed), and then, the processing proceeds to STEP S24 while the STEP S23 being skipped.

Figure 17:
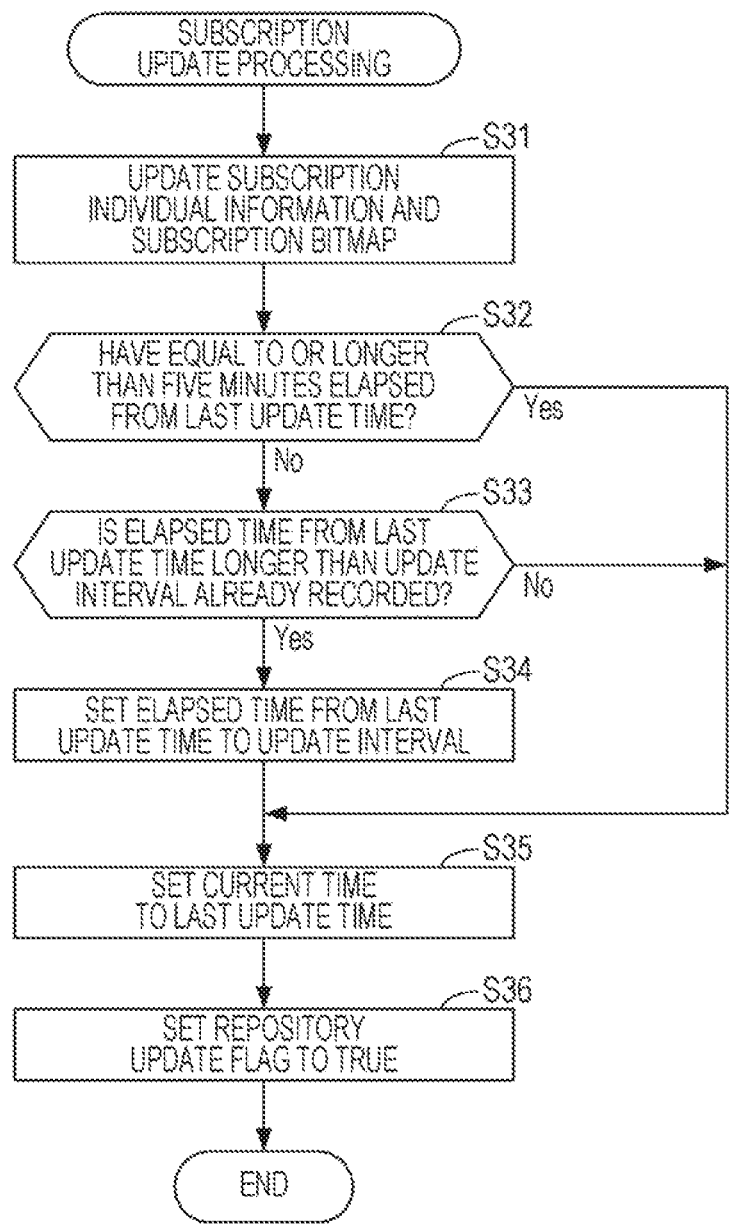
FIG. 17 is a flowchart illustrating an example of subscription update processing.

FIG. 17 is a flowchart illustrating an example of the subscription update processing. Hereinafter, the processing illustrated in FIG. 17 is described along with STEP numbers. The procedure described below corresponds to STEP S14 in FIG. 15.

(S31) The notification control section 111 updates the subscription individual information 124 and the subscription bitmap 125 stored in the RAM 102 in response to the update request for the subscription. Specifically, the update request includes information designating a filter that receives the listener name and the notification. The notification control section 111 specifies the dummy subscription corresponding to the designated filter. The notification control section 111 registers the first keyword identifier corresponding to the first keyword included in the specified dummy subscription and the listener name in the subscription individual information 124. In addition, the notification control section 111 registers the second keyword identifier corresponding to the second keyword included in the specified dummy subscription and the time set as the update time and the application start time in the subscription individual information 124. Furthermore, the notification control section 111 sets the bit corresponding to the designated filter of the subscription bitmap corresponding to the listener, to "1".

(S32) The notification control section 111 determines whether or not equal to or more than five minutes have elapsed from the last update time of the indication information by the corresponding listener referring to the update management information 126 stored in the RAM 102. When equal to or more than five minutes have elapsed, the processing proceeds to STEP S35. When equal to or more than five minutes does not have elapsed, the processing proceeds to STEP S33.

(S33) The notification control section 111 determines whether or not the elapsed time from the last update time for the corresponding listener to the current time is longer than the update interval already recorded for the corresponding listener referring to the update management information 126. When the elapsed time is longer than the update interval, the processing proceeds to STEP S34. When the elapsed time is not longer than the update interval, the processing proceeds to STEP S35.

(S34) The notification control section 111 sets the elapsed time from the last update time for the corresponding listener to the current time to the update interval of the listener in the update management information 126. (S35) The notification control section 111 sets the current time to the last update time for the corresponding listener in the update management information 126.

(S36) The notification control section 111 sets the repository update flag to TRUE in the update management information 126. When the repository update flag is already TRUE, the notification control section 111 sets TRUE by overwriting. Then, the processing ends.

As indicated in STEP S32, when the elapsed time is equal to or longer than five minutes, the notification control section 111 does not perform the update of the update interval for the corresponding listener. It is because the update of the indication information in this case is considered to be an update by another sequence (deletion of the subscription, or the like).

In addition, as indicated in STEP S33, when the elapsed time from the last update time is longer than the update interval already recorded, the notification control section 111 overwrites the update interval with the current update interval. That is, the maximum update interval among a set of update intervals is set as the update interval by the corresponding server. In this way, in the polling check processing described later, it is possible to appropriately specify the timing at which the reception of a series of update requests by the corresponding server is completed.

Furthermore, when an event registered in the filter information 121 is detected in the storage device 10, the notification control section 111 identifies the target listener for the indication notification in response to the detected event referring to the subscription bitmap 125 stored in the RAM 102. The notification control section 111 specifies the IP address of the target listener, and performs the indication notification processing referring to the listener information 123. In this case, the notification control section 111 may search the listener at a high speed by searching the target listener of the indication notification using the subscription bitmap 125.

FIG. 18 is a diagram illustrating an example of information items that are written into the BUD and information items that are not written into the BUD. Among the information items illustrated in FIG. 7, the CM 100 performs the backup by writing the filter information 121, the listener information 123, the subscription individual information 124 and the subscription bitmap 125 into the BUD 103.

The list of supported filters here depends on the version of the firmware of the storage device 10 (or the firmware of the CM 100). Therefore, the BUD control section 112 makes the filter information 121 corresponding to the subscription bitmap 125 be a target to be written into the BUD 103.

On the other hand, the dummy subscription 122 may be reconstructed from the filter information 121. Therefore, the dummy subscription 122 is not the target to be written to the BUD 103. In addition, the update management information 126 is information for controlling the performance of the backup, and is not used as an indication function. Therefore, the update management information 126 is not the target to be written into the BUD 103.

Figure 19:
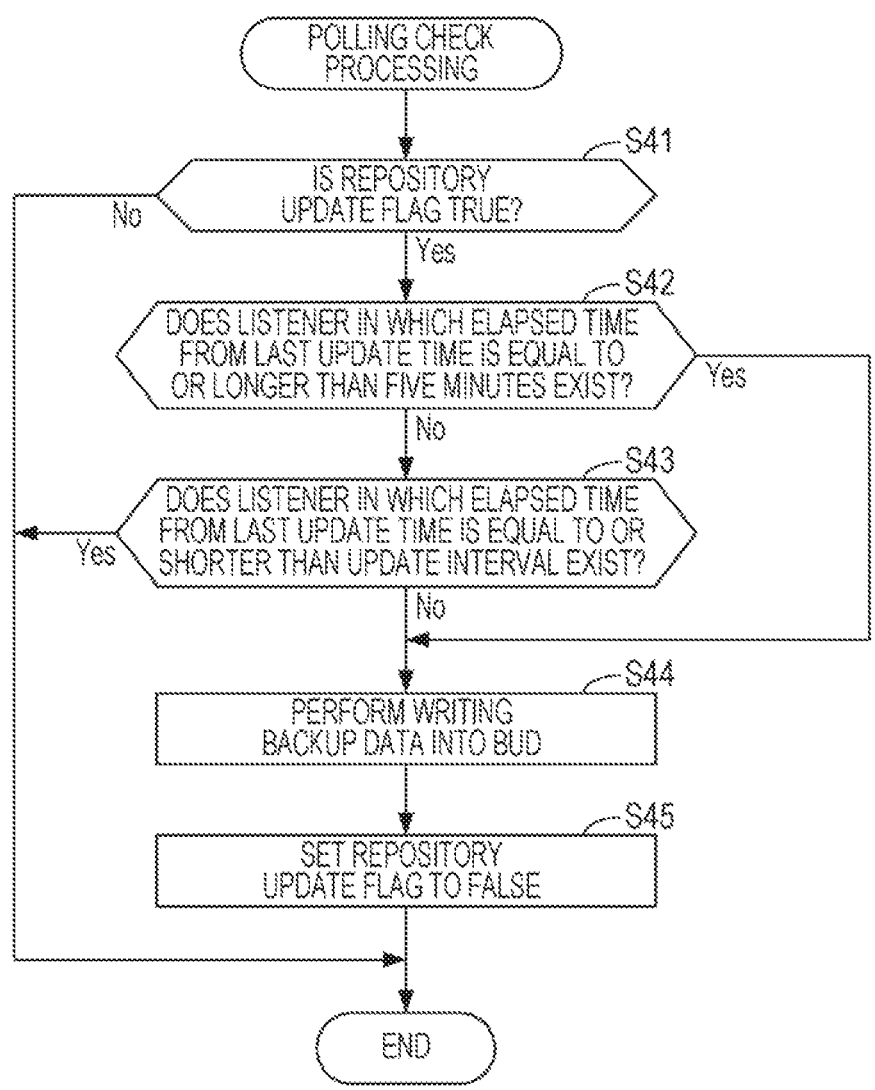
FIG. 19 is a flowchart illustrating an example of polling check processing.

FIG. 19 is a flowchart illustrating an example of the polling check processing. Hereinafter, the processing illustrated in FIG. 19 is described along with STEP numbers. The BUD control section 112 performs the following procedure at a predetermined cycle (for example, a cycle of five seconds).

(S41) The BUD control section 112 determines whether or not the repository update flag is TRUE referring to the update management information 126 stored in the RAM 102. In a case of TRUE, the processing proceeds to STEP S42. In a case of not TRUE (that is, in a case of FALSE), the processing ends.

(S42) The BUD control section 112 determines whether or not there exists the listener in which the elapsed time from the last update time is equal to or longer than five minutes referring to the update management information 126. When there exists the listener in which the elapsed time from the last update time is equal to or longer than five minutes, the processing proceeds to STEP S44. When there does not exist the listener in which the elapsed time from the last update time is equal to or longer than five minutes, the processing proceeds to STEP S43.

(S43) The BUD control section 112 determines whether or not there exists the listener in which the elapsed time from the last update time is equal to or shorter than the update interval referring to the update management information 126. When there exists the listener in which the elapsed time from the last update time is equal to or shorter than the update interval, the processing ends (the backup is postponed). When there does not exist the listener in which the elapsed time from the last update time is equal to or shorter than the update interval, (that is, when the elapsed time from the last update time is longer than the update interval for all the listeners recorded in the update management information 126), the processing proceeds to STEP S44.

There may be a listener in which the update interval is set as an invalid value (0 seconds). In this case, the BUD control section 112 assumes that the corresponding listener is a listener in which the elapsed time from last update time is equal to or shorter than the update interval when the elapsed time from the last update time is shorter than five seconds (=polling check cycle). On the other hand, the BUD control section 112 assumes that the corresponding listener is a listener in which the elapsed time from the last update time is longer than the update interval when the elapsed time from the last update time is longer than five seconds.

(S44) The BUD control section 112 generates the backup data by duplicating the filter information 121, the listener information 123, the subscription individual information 124 and the subscription bitmap 125 stored in the RAM 102, and writes the backup data into the BUD 103. That is, the BUD control section 112 performs the backup of the indication information.

(S45) The BUD control section 112 sets the repository update flag to FALSE in the update management information 126. The values of the last update time and the update interval for each listener in the update management information 126 are held in the RAM 102. Then, the processing ends.

Here, the reason for performing the determination in STEP S42 is because there may be a concern that it takes time until the update content is backed up by another listener after the indication information is continuously updated from one listener and the update by another listener is completed. If it takes a time for the backup, a risk of losing the update content due to a power failure is also increased. Therefore, when there exists a listener in which the elapsed time from the last update time is equal to or longer than five minutes, the BUD control section 112 immediately performs the backup of the indication information.

As described above, the BUD control section 112 starts the backup of the indication information for each server when the elapsed time from the last update time is longer than the reception interval of the update request. In addition, the BUD control section 112 postpones the start of the backup of the indication information for at least one server when the elapsed time from the last update time is not longer than the reception interval of the update request.

Figure 20:
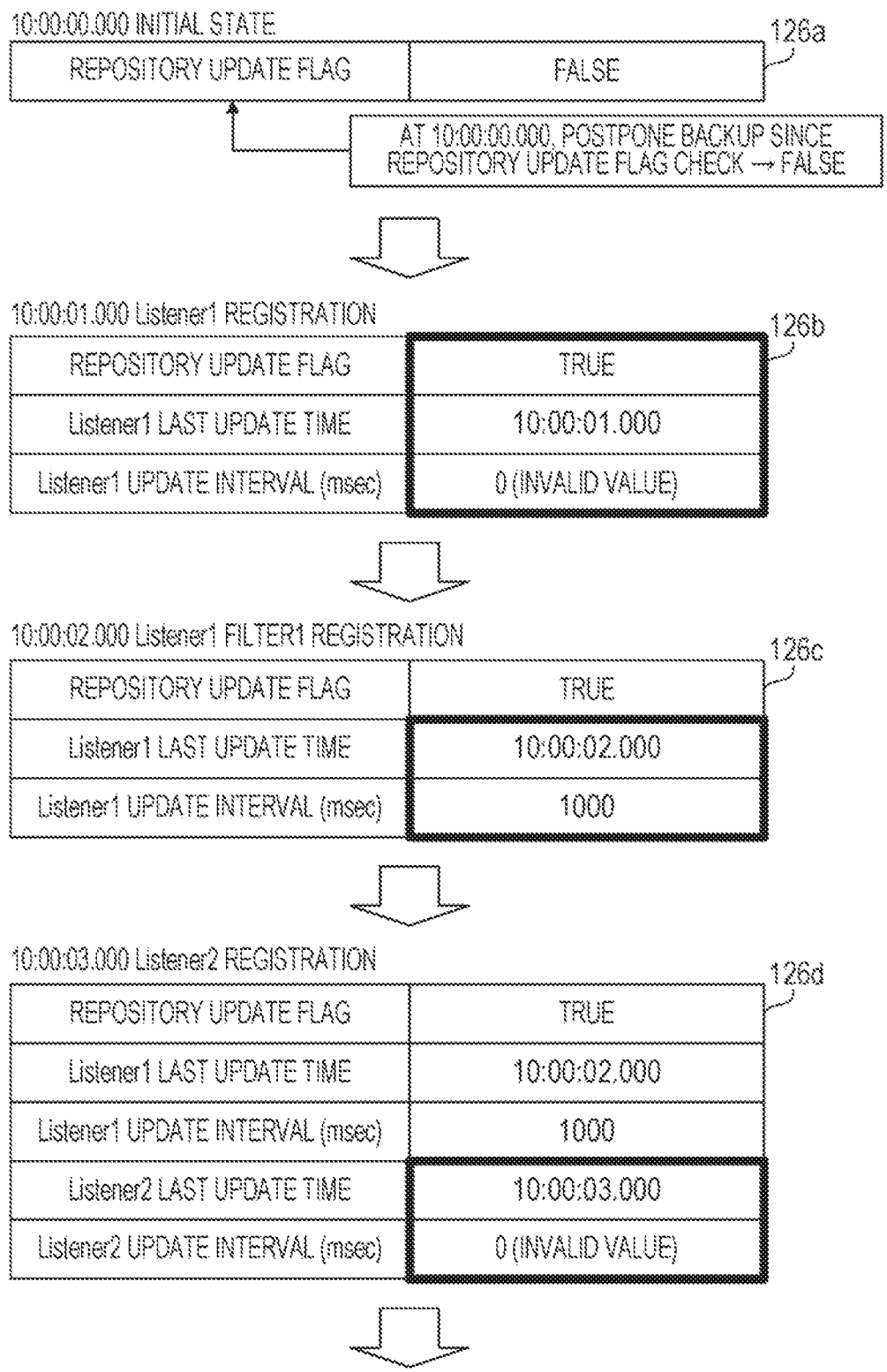
FIG. 20 is a diagram illustrating an example of the polling check.

FIG. 20 is a diagram illustrating an example of the polling check. In the following example, the polling check period is five seconds. The update management information 126a (initial state) at the timing of 10:00:00 includes the repository update flag=FALSE. At the timing of 10:00:00, the BUD control section 112 performs the polling check. Since the repository update flag is FALSE (No in STEP S41), the BUD control section 112 postpones the backup.

At the timing of 10:00:01, the notification control section 111 performs the listener registration of the server 200 in response to the update request from the server 200. The notification control section 111 then sets the repository update flag to TRUE. The notification control section 111 registers the last update time "10:00:01.000" and the update interval "0 (invalid value)" in the update management information 126a for the listener name "Listener1" of the server 200. The update management information 126b indicates the state after the registration.

At the timing of 10:00:02, the notification control section 111 performs registration of the filter number "1" (filter1) for server 200 in response to the update request from server 200. In this case, the notification control section 111 registers the last update time "10:00:02.000" and the update interval "1000" (msec) for the listener name "Listener1" of the server 200 in the update management information 126*b*. The update management information 126*c* indicates the state after the registration.

At the timing of 10:00:03, the notification control section 111 performs listener registration for the server 300 in response to the update request from server 300. The notification control section 111 registers the last update time "10:00:03.000" and the update interval "0 (invalid value)" in the update management information 126*c* for the listener name "Listener2" of the server 300. The update management information 126*d* indicates the state after the registration.

FIG. 21 is a diagram illustrating an example (continued) of the polling check. At the timing of 10:00:04, the notification control section 111 performs the registration of the filter number "2" (filter2) to the server 200 in response to the update request from the server 200. In this case, the notification control section 111 registers the last update time "10:00:04.000" and the update interval "2000" (msec) for the listener name "Listener1" of the server 200 in the update management information 126*d*. The update management information 126*e* indicates the state after the registration.

At the timing of 10:00:05, the BUD control section 112 performs a polling check. According to the update management information 126*e*, the repository update flag is TRUE (Yes in STEP S41). In addition, there is no listener in which the elapsed time from the last update time is equal to or longer than five minutes (No in STEP S42).

However, for the server 200 (Listener1), the elapsed time from the last update time (10:00:04.000) is shorter than the update interval (2000 msec). In addition, for the server 300 (Listener2), the elapsed time from the last update time (10:00:03.000) is shorter than five seconds (Yes in STEP S43). Therefore, the BUD control section 112 postpones the backup at the current timing.

At the timing of 10:00:06, the notification control section 111 performs registration of the filter number "6" (filter6) to the server 300 in response to the update request from the server 300. In this case, the notification control section 111 registers the last update time "10:00:06.000" and the update interval "3000" (msec) to the listener name "Listener2" of the server 300 in the update management information 126*e*. The update management information 126*f* indicates the state after the registration.

FIG. 22 is a diagram illustrating an example (continued) of the polling check. At the timing of 10:00:09, the notification control section 111 performs the registration of the filter number "7" (filter7) for server 300 in response to an update request from server 300. In this case, the notification control section 111 registers the last update time "10:00:09.000" and the update interval "3000" (msec) for the listener name "Listener2" of the server 300 in update management information 126*f*. The update management information 126*g* indicates the state after the registration.

At the timing of 10:00:10, the BUD control section 112 performs the polling check. According to the update management information 126*g*, the repository update flag is TRUE (Yes in STEP S41). There is no listener in which the elapsed time from the last update time is longer than five minutes (No in STEP S42). Furthermore, for the server 200 (Listener1) the elapsed time from the last update time (10:00:04.0000) is equal to or longer than the update interval (2000 msec).

However, for the server 300 (Listener2), the elapsed time from the last update time (10:00:09.000) is shorter than the update interval (3000 msec) (Yes in Step S43). Therefore, the BUD control section 112 postpones the backup at the current timing.

At the timing of 10:00:15, the BUD control section 112 performs a polling check. According to update management information 126*g*, the repository update flag is TRUE (Yes in STEP S41). In addition, there is no listener in which the elapsed time from the last update time is equal to or longer than five minutes (No in STEP S42). Furthermore, for the server 200 (Listener1), the elapsed time from last update time (10:00:04.000) is equal to or longer than the update interval (2000 msec). In addition, for the server 300 (Listener2), the elapsed time from the last update time (10:00:09.000) is equal to or longer than the update interval (3000 msec) (No in STEP S43).

Therefore, the BUD control section 112 starts the backup of the indication information (STEP S44). When the backup is completed, the BUD control section 112 sets the repository update flag to FALSE in the update management information 126*g* (STEP S45). The update management information 126*h* indicates the state after the setting.

In this way, the CM 100 may reduce the frequency of backup by performing a backup to the timing that the updates of the servers 200, 300, and 400 are estimated to be completed.

Incidentally, if the frequency of backup is too frequent or too small, it may affect an undesirable influence on the system. For example, it may be considered that the backups of the indication information are acquired at every time the servers 200, 300, and 400 are updated respectively. However, in this method, the frequency of backups is increased. Therefore, due to the loads of the CM 100 and the BUD 103 caused by the backup, there is a possibility that other processing (for example, future task processing by the CM 100 and the servers 200, 300, and 400) may be affected.

Specifically, if the CM 100 responds to the update request after performing the update and backup in response to the update request, a response delay time to the update request increases due to the backup time, and thus, performing of the next processing by the CM 100 and the servers 200, 300, and 400 may be delayed. Alternatively, there is a possibility that the resource is locked at BUD 103 into which the backup data is written, and waiting time may occur for the task processing by the servers 200, 300, and 400 to perform log writing into the BUD 103.

On the other hand, for example, the backup of the indication information performed at the scheduled time may also be considered. In this method, the frequency of backup may be reduced rather than performing the backup in response to every update request. However, on the other hand, there is a high possibility that the currently acquired backup data is not the backup data corresponding to the indication information of the latest state. In this case, when attempting to recover the indication information from the backup data, the possibility that the indication information may not be restored to the latest state is high, and thus, there is a concern that the indication information may not be properly preserved.

Therefore, the CM 100 records the reception interval (update interval) and last reception time (last update time) of a series of update requests issued by the servers 200, 300, and 400. Then, the CM 100 starts the backup of the indication information at the timings that the issuance of a series of update requests by each of the servers 200, 300, and 400 are estimated to be completed.

In this way, it is possible to efficiently acquire the backup data corresponding to the latest state of the indication information while reducing the frequency of backup. The CM 100 holds the backup of the indication information (does not start the backup) while it is determined that the indication information is being updated by at least one server among a plurality of servers. The reason why is as described below.

For example, if the backup data is acquired although the indication information is being updated by the server 300, the subsequent updates by the server 300 are not reflected in the current backup data. Here, among a series of update requests, the time difference between the reception time of the first update request and the reception time of the last update request is usually relatively short, and thus, it is considered that the possibility of losing the indication information due to a power failure during such a short time interval is relatively low. Therefore, the CM 100 refrains from acquiring the backup data while any of the servers is updating the indication information.

However, if the updates of the indication information by a plurality of servers overlap, the time it takes for each server to complete the update is prolonged. Therefore, when it is detected that the update of the indication information by each server that issued the update request for the indication information at the same time is completed, the CM 100 immediately starts the backup of the indication information. In this way, it is possible to acquire the backup data of a newer state at a relatively earlier timing for each server update. As a result, it is possible to improve the possibility of restoring the indication in the latest state for each server using the backup data. In other words, both the reduction of the frequency of backup and the data preservation by the backup may be achieved.

In addition, since the backup is performed at the timing determined asynchronously with the data update by the update request, speed-up of the response time to the update request may be achieved. The notification control section 111 may also output the subscription for each listener according to the user's instructions.

FIGS. 23A and 23B are diagrams illustrating output examples of the subscription. FIG. 23A illustrates the subscription 122a output to the server 200 (Listener1). FIG. 23B illustrates the subscription 122b output to the server 300 (Listener2).

For example, the notification control section 111 receives an instruction to output the subscription relating to the notification target event to the server 200 from the server 200. Then, the notification control section 111 specifies the filter number of the notification target to the server 200 referring to the bitmap 125a corresponding to Listener1. The notification control section 111 specifies the dummy subscription corresponding to the specified filter number. The notification control section 111 generates the subscription by replacing the key word of the corresponding dummy subscription with the value registered in the subscription individual information 124. For example, the notification control section 111 generates subscription 122a for the dummy subscription 122, and transmits the subscription 122a to the server 200.

Figure 24:
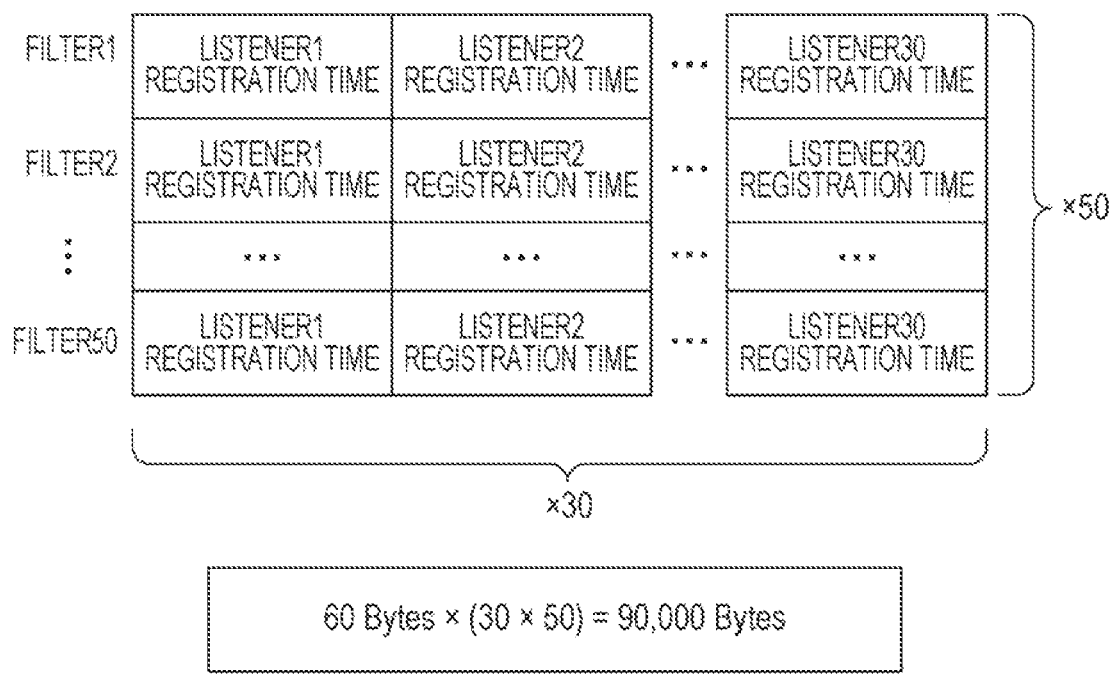
FIG. 24 is a diagram illustrating an example of an amount of writing into the BUD.

Similarly, the notification control section 111 may also generate subscription 122b for the server 300, and transmit the subscription 122b to the server 300. FIG. 24 is a diagram illustrating an example of an amount of writing into the BUD. For example, as an example, a case is considered, where the number of listeners is 30, the number of filters is 50, and the amount of data of the listener information 123 and the subscription individual information 124 per a listener is 60 bytes. In this case, the amount of data written into the BUD 103 by the BUD control section 112 for one performance of backup is approximately 60 bytes×(30×50) =90,000 bytes. Since the sizes of the filter information 121 and the subscription bitmap 125 are smaller than the total size of the listener information 123 and the subscription individual information 124, the filter information 121 and the subscription bitmap 125 are ignored here.

Figure 25:
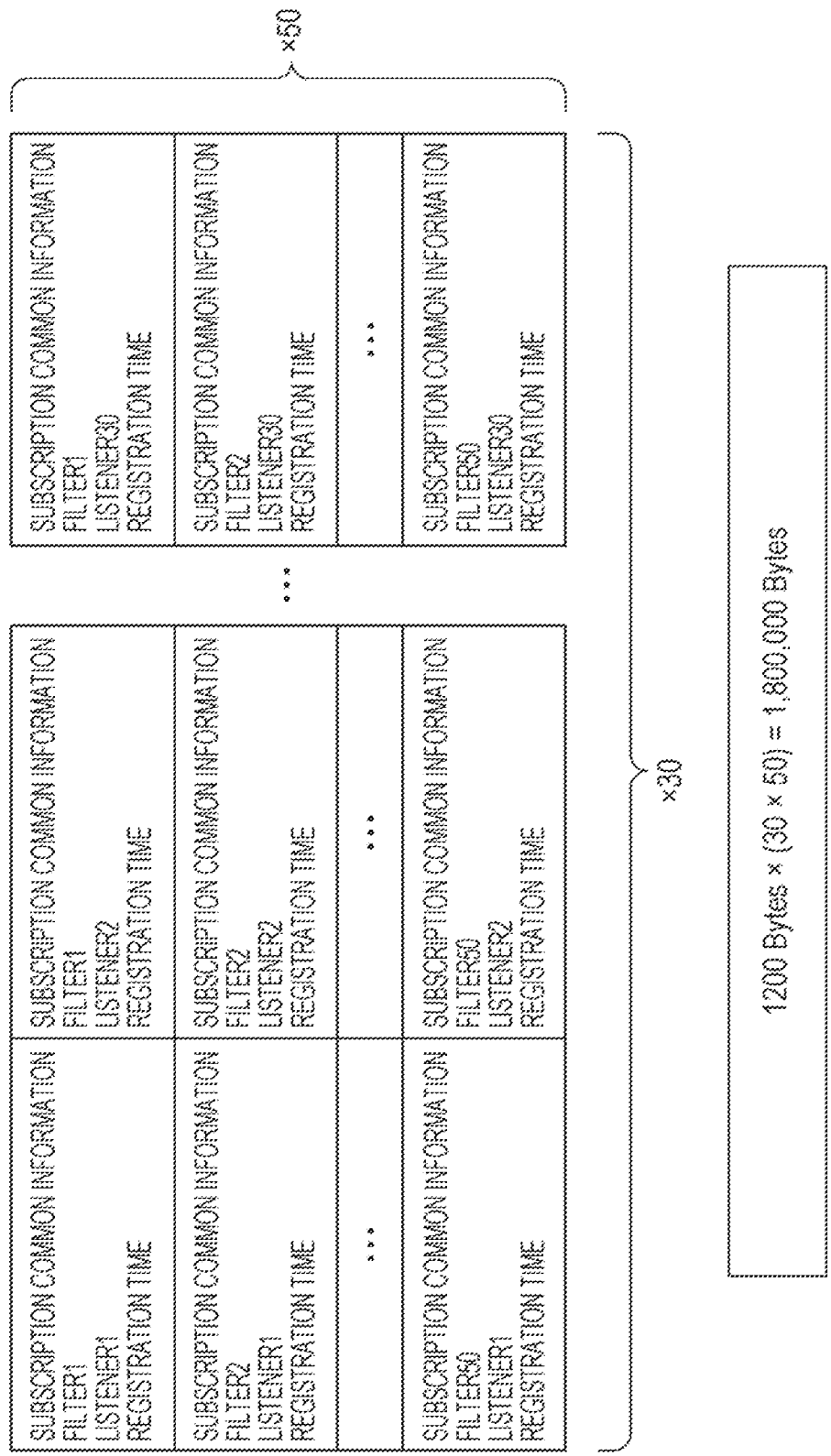
FIG. 25 is a diagram illustrating a comparison example of an amount of writing into the BUD.

FIG. 25 is a diagram illustrating a comparison example of an amount of writing into the BUD. An operation may also be considered, in which the CM 100 individually holds the subscription for each listener without using the dummy subscription 122, subscription individual information 124 and subscription bitmap 125. In this case, the amount of data for subscriptions per one listener reaches, for example, approximately 1200 bytes. Here, similarly to FIG. 24, a case may be considered, in which the number of listeners to be managed is 30 and the number of filters is 50. In this case, the size of the backup data of the subscriptions of all the listeners is 1200 bytes×(30×50)=1,800,000 bytes.

That is, according to the CM 100, in the second embodiment, the size of the backup data to be written into the BUD 103 may be reduced to approximately ¹/₂₀ compared to the comparison example illustrated in FIG. 25. As described above, a life of the SSD used as the BUD 103 may be extended by reducing the size of the data to be written into the BUD 103. In addition, since the number of times of writing is reduced rather than writing backup data into the BUD 103 in response to every update request, this point also contributes to extending the life of the SSD used as the BUD 103.

Furthermore, in a case of the comparison example illustrated in FIG. 25, the amount of written data is large, and thus, it takes a long time to perform serialization processing to write each subscription distributed in the repository (total number 1500 in the example) into the continuous area of the BUD 103, or to write the subscription into the BUD 103. This may cause a delay in backup processing.

On the other hand, in the second embodiment, the BUD control section 112 makes the unique information (dummy subscriptions) for each listener in the subscription be the target for backup, and excludes the fixed information that may be generated from the filter information from the target for backup. In this way, it is possible to reduce the total amount of writing the data into the BUD 103 and the speed-up of the backup processing may be achieved.

The information processing in the first embodiment may be realized by causing the processing section 1b to execute the program. In addition, the information processing in the second embodiment may be realized by causing the processor 101 to execute the program. The program may be recorded in the computer readable recording medium 11.

For example, the program may be distributed by distributing the recording medium 11 in which the program is re #corded. In addition, the program may be stored in another computer, and then, the program may be distributed via the network. For example, a program recorded in the recording medium 11 or a program received from another computer may be stored (installed) in a storage device such as the RAM 102 or the BUD 103, and then, the computer may read the program from the storage device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device configured to backup data updated in response to update requests issued by each of a plurality of host devices, the control device comprising:
    a memory; and
    a processor configured to:
        record, in the memory, a last reception time of the update requests from each host device and a prior reception interval between the previous two reception times of the update requests from each host device before the last reception time of the current update request,
        compare, for each of the plurality of host devices, an elapsed time from the last reception time of the update request with the reception interval at a certain timing which is asynchronous with the update requests, the certain timing being a candidate timing to start the backup, and
        start the backup for each of the plurality of host devices based on a comparison result.

2. The control device according to claim 1, wherein the processor is configured to start the backup when the elapsed time is longer than the reception interval for each of the plurality of host devices, and to postpone the start of the backup that should have occurred when the elapsed time is not longer than a reception interval for at least one of the host devices.

3. The control device according to claim 2, wherein, even when the elapsed time is not longer than the reception interval for at least one of the host devices, the processor is configured to start the backup when the elapsed time is longer than a certain time for the other host devices.

4. The control device according to claim 1, wherein the data are configured to include unique information for each of the plurality of host devices and fixed information that is generated from other information, and
wherein, among the data, the processor is configured to target the unique information for the backup and to exclude the fixed information from the target for the backup.

5. The control device according to claim 1, wherein the certain timing which is asynchronous with the update requests, is in response to each of the received update requests.

6. The control device according to claim 1, wherein, in the backup, the processor is configured to generate backup data based on the data stored in a first storage and to store the backup data in a second storage that includes a memory having a limited number of writings.

7. A non-transitory, computer-readable recording medium having stored therein a program for causing a computer to execute a process, the process comprising:
    controlling backup of data updated in response to update requests issued by each of a plurality of host devices;
    recording a last reception time of the update requests in a memory from each host device and a prior reception interval between the previous two reception times of the update requests from each host device before the last reception time of the current update request;
    comparing, for each of the plurality of host devices, an elapsed time from the last reception time of the update request with the reception interval at a certain timing which is asynchronous with the update requests, the certain timing being a candidate timing to start the backup; and
    starting the backup for each of the plurality of host devices based on a comparison result.

8. The computer readable recording medium according to claim 7,
wherein, in the starting of the backup, the computer is configured to execute a process of the starting of the backup when the elapsed time is longer than the reception interval for each of the plurality of host devices, and to postpone the starting of the backup that should have occurred when the elapsed time is not longer than the reception interval for at least one of the host devices.

9. The computer readable recording medium according to claim 8,
wherein, in the starting of the backup, even when the elapsed time is not longer than the reception interval for at least one of the host devices, the computer is configured to execute a process of starting of the backup when the elapsed time is longer than a certain time for the other host devices.

10. The computer readable recording medium according to claim 7,
wherein the data are configured to include unique information for each of the plurality of host devices and fixed information is generated from other information, and
wherein, in the backup, the computer is configured to execute a process of targeting the unique information for the backup and to exclude the fixed information from the target for the backup.

11. The computer readable recording medium according to claim 7,
wherein, the certain timing which is asynchronous with the update requests, is in response to the received update request.

12. The computer readable recording medium according to claim 7,
wherein, in the backup, the computer is configured to execute a process of generating backup data based on the data stored in a first storage, and to store the backup data in a second storage that includes a memory having a limited number of writings.

* * * * *